US010659718B2

(12) United States Patent
Kwon et al.

(10) Patent No.: US 10,659,718 B2
(45) Date of Patent: May 19, 2020

(54) IMAGE DISPLAY APPARATUS

(71) Applicant: LG ELECTRONICS INC., Seoul (KR)

(72) Inventors: Taewook Kwon, Seoul (KR); Bongsik Kwak, Seoul (KR); Sungkyu Kim, Seoul (KR); Jeongkyo Seo, Seoul (KR); Beomseok Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/036,245

(22) Filed: Jul. 16, 2018

(65) Prior Publication Data
US 2019/0020848 A1 Jan. 17, 2019

(30) Foreign Application Priority Data
Jul. 17, 2017 (KR) .................. 10-2017-0090466

(51) Int. Cl.
*G06F 3/038* (2013.01)
*G09G 5/00* (2006.01)
*H04N 5/63* (2006.01)
*H02J 50/05* (2016.01)
*H02M 3/335* (2006.01)
*H04N 5/655* (2006.01)
*H02M 1/00* (2006.01)
*H02M 1/08* (2006.01)

(52) U.S. Cl.
CPC ............... *H04N 5/63* (2013.01); *H02J 50/05* (2016.02); *H02M 3/33569* (2013.01); *H04N 5/655* (2013.01); *H02M 1/08* (2013.01); *H02M 3/33576* (2013.01); *H02M 2001/0009* (2013.01)

(58) Field of Classification Search
CPC ........... H04N 5/63; H04N 5/655; H02J 50/05; H02M 3/33569; H02M 1/08; H02M 3/33576; H02M 2001/0009; G06F 3/038; G09G 5/00
USPC .................................. 345/211; 348/730, 739
See application file for complete search history.

(56) References Cited

U.S. PATENT DOCUMENTS 9,094,059 B2 * 7/2015 Lee .................... H04B 5/0031
10,148,127 B2 * 12/2018 Bae ........................ H02J 17/00
2017/0038641 A1 * 2/2017 Yamazaki ......... G02F 1/133555

FOREIGN PATENT DOCUMENTS

| CN | 103093736 A | 5/2013 |
|---|---|---|
| KR | 10-2012-0132225 A | 12/2012 |
| KR | 10-2015-0048551 A | 5/2015 |
| KR | 10-2016-0142719 A | 12/2016 |
| KR | 10-2017-0064882 A | 6/2017 |

* cited by examiner

Primary Examiner — Trang U Tran
(74) Attorney, Agent, or Firm — Birch, Stewart, Kolasch & Birch, LLP.

(57) ABSTRACT

An image display apparatus are disclosed. The image display apparatus includes a display including a first electrode and a second electrode, for wireless power reception, a signal processor disposed apart from the display, and including a third electrode and a fourth electrode, for wireless power transmission, and a first bridge electrode and a second bridge electrode, including one ends apart from the first electrode and the second electrode, facing the first electrode and the second electrode, and the other ends apart from the first bridge electrode and the second bridge electrode, facing the first bridge electrode and the second bridge electrode.

20 Claims, 25 Drawing Sheets

IMAGE DISPLAY APPARATUS

CROSS-REFERENCE TO RELATED APPLICATION

This application claims the benefit of Korean Patent Application No. 10-2017-0090466, filed on Jul. 17, 2017 in the Korean Intellectual Property Office, the disclosure of which is incorporated herein by reference.

BACKGROUND OF THE INVENTION

1. Field of the Invention

The present disclosure relates to an image display apparatus, and more particularly, to an image display apparatus for efficiently transmitting wireless power between a display and a signal processor which are arranged apart from each other.

2. Description of the Related Art

An image display apparatus is a device having the functionality of displaying an image. The image display apparatus outputs images in various manners such as output of an image through a display panel or projection of an image to the outside by means of visible light.

Along with the trend toward large-sized and premium image display apparatuses, a display is spaced from a signal processor that provides a video signal to the display in an image display apparatus.

A power cable is needed between the display and the signal processor. However, in this case, the image display apparatus is not pleasing aesthetically due to the color of the power cable, and so on.

SUMMARY OF THE INVENTION

Therefore, the present disclosure has been made in view of the above problems, and an aspect of the present disclosure is to provide an image display apparatus for efficiently transmitting wireless power between a display and a signal processor which are arranged apart from each other.

In an aspect of the present disclosure, the above and other objects can be accomplished by the provision of an image display apparatus. The image display apparatus includes a display including a first electrode and a second electrode, for wireless power reception, a signal processor disposed apart from the display, and including a third electrode and a fourth electrode, for wireless power transmission, and a first bridge electrode and a second bridge electrode, including one ends apart from the first electrode and the second electrode, facing the first electrode and the second electrode, and the other ends apart from the first bridge electrode and the second bridge electrode, facing the first bridge electrode and the second bridge electrode.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Embodiments of the present disclosure will be described below in detail with reference to the attached drawings.

The terms 'module' and 'unit' used to signify components are used herein to help the understanding of the components and thus they should not be considered as having specific meanings or roles. Accordingly, the terms 'module' and 'unit' may be used interchangeably.

Figure 1:
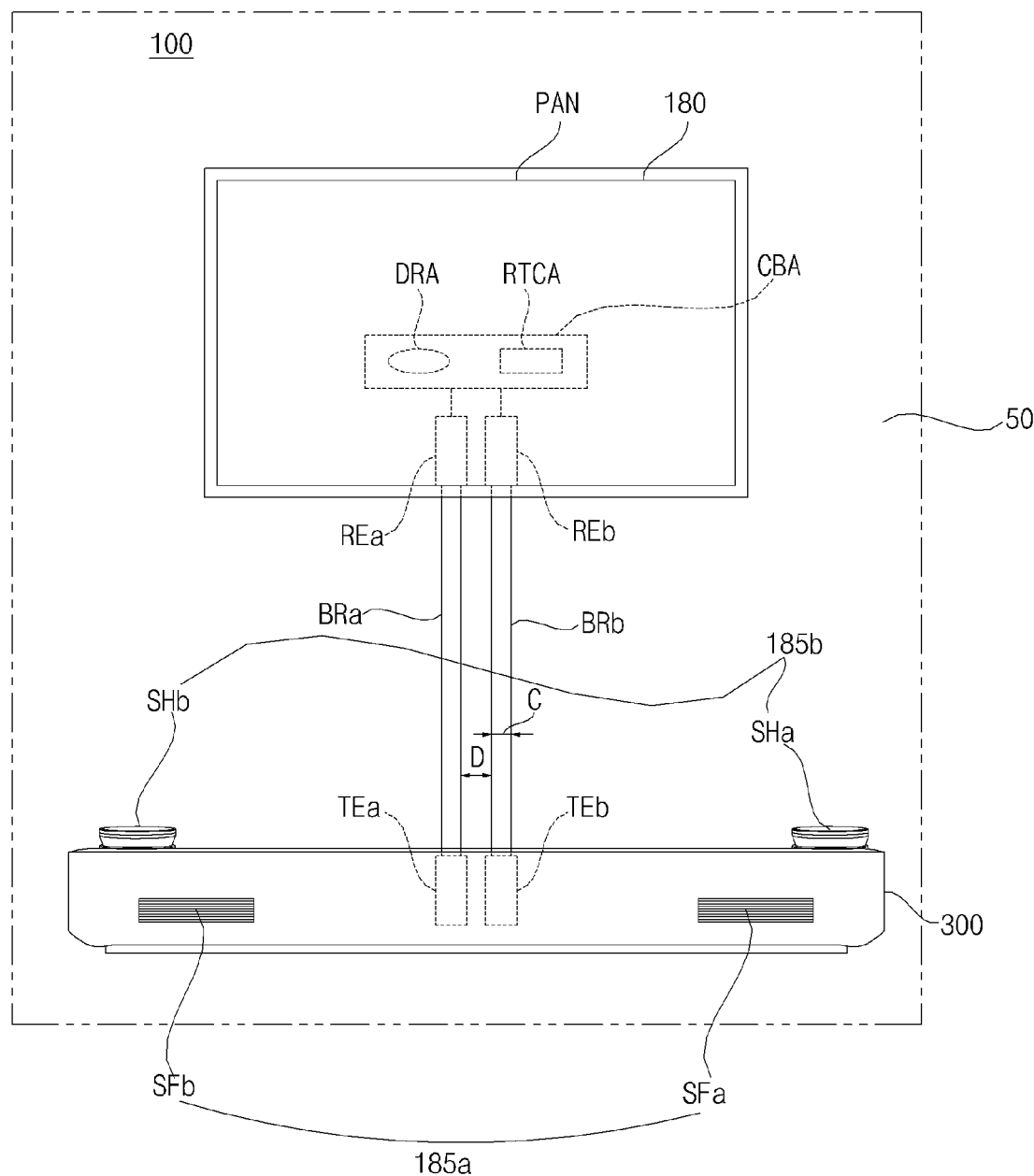
FIG. 1 is a view illustrating an image display apparatus according to an embodiment of the present disclosure.
Figure 2:
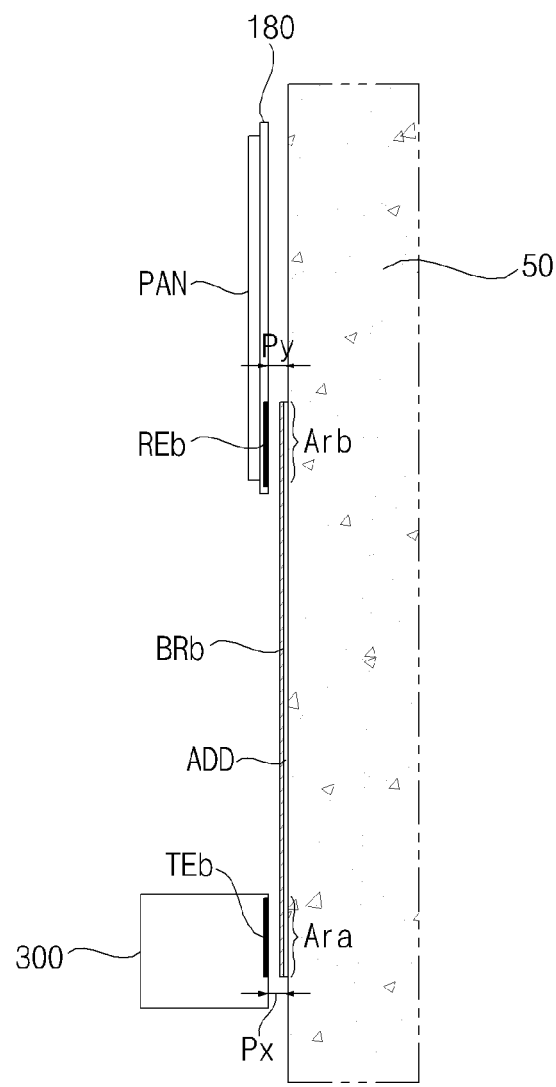
FIG. 2 is a side view illustrating the image display apparatus illustrated in FIG. 1.

FIG. 1 is a view illustrating an image display apparatus according to an embodiment of the present disclosure, and FIG. 2 is a side view illustrating the image display apparatus illustrated in FIG. 1.

Referring to FIG. 1, an image display apparatus 100 according to an embodiment of the present disclosure includes a display 180 having a first electrode REa and a second electrode REb for wireless power reception, a signal processor 300 apart from the display 180 and having a third electrode TEa and a four electrode TEb for wireless power transmission, and first and second bride electrodes BRa and BRb having one ends facing the first and second electrodes REa and REb, apart from the first and second electrodes REa and REb and the other ends facing the third and fourth electrodes TEa and TEb, apart from the third and fourth electrodes TEa and TEb.

A cable for power connection is not disposed between the display 180 and the signal processor 300. Rather, wireless power may be transmitted efficiently between the display 180 and the signal processor 300 by means of the first and second bride electrodes BRa and BRb.

Particularly, as illustrated in FIG. 2, the first and second bride electrodes BRa and BRb are spaced from the first and second electrodes REa and REb by a gap Py, and spaced from the third and fourth electrodes TEa and TEb by a gap Px.

Wireless power may be transferred based on capacitance between the first and second bride electrodes BRa and BRb and the first and second electrodes REa and REb, and capacitance between the first and second bride electrodes BRa and BRb and the third and fourth electrodes TEa and TEb. This power transfer scheme may be referred to Capacitive Power Transfer (CPT).

Compared to a wireless power transfer scheme using an inductor or a coil, the CPT scheme offers the benefits of high efficiency and relatively small heat emission during wireless power transmission. Accordingly, wireless power may be transferred efficiently between the display 180 and the signal processor 300.

In the CPT scheme, however, interference may occur between the first and second bride electrodes BRa and BRb, thereby decreasing the efficiency of wireless power transmission.

Therefore, it is preferred that the gap D between the first and second bride electrodes BRa and BRb is larger than the width C of the first bride electrode BRa or the width C of the second bridge electrode BRb.

Accordingly, the interference between the first and second bride electrodes BRa and BRb is minimized, thereby increasing the efficiency of wireless power transmission.

Referring to FIG. 2, the image display apparatus 100 may include an attachment member ADD on which the first and second bride electrodes BRa and BRb are disposed.

As illustrated in FIG. 2, the attachment member ADD may be attached onto a wall 50 behind the display 180 and the signal processor 300. Thus, a user may simply attach the attachment member ADD having the first and second bride electrodes BRa and BRb disposed thereon to the wall 50.

Particularly, the attachment member ADD may be wound into a roll, thus enabling simple attachment of the attachment ADD onto the wall 50.

The display 180 may be provided with a display circuit board CBA and a panel PAN.

The circuit board CBA of the display 180 may include a power reception circuit unit RTCA to convert wireless power received through the first and second electrodes REa and REb to Direct Current (DC) power and outputting the DC power, and a driving circuit unit DRA for outputting a signal for image display to the panel PAN, using the DC power received from the power reception circuit unit RTCA.

The power reception circuit unit RTCA may be any of power reception circuit units illustrated in FIGS. 4 to 7.

The driving circuit unit DRA may include a timing controller for outputting a drive signal to drive the panel PAN, a scan driver for driving the panel PAN based on the driver signal, and a data driver.

The panel PAN may be any of an Organic Light Emitting Diode (OLED) panel, a Liquid Crystal Display (LCD) panel, and a Light Emitting Diode (LED) panel.

The signal processor 300 may perform a signal process on an image received from the outside or an image stored in an internal memory, and transmit the signal-processed video signal wirelessly to the display 180.

The video signal may be transmitted wirelessly in a different manner from wireless power transfer. For example, the video signal may be transmitted wirelessly in a higher frequency than in wireless power transfer. Specifically, the video signal may be transmitted wirelessly by Wireless Gigabit Alliance (WiGig), Wireless Display (WiDi), or Miracast at about 60 GHz, or by Wireless Fidelity Direct (WiFi Direct).

The signal processor 300 may include a circuit board CBB for transmitting wireless power to the display 180.

The circuit board CBB may include a signal processing circuit unit SRA for performing a signal process on a video signal, and a power transmission circuit unit PTCA for wireless power transmission.

The power transmission circuit unit PTCA may be any of power transmission circuit units illustrated in FIGS. 4 to 7.

The signal processor 300 may process an audio signal, and output a sound in synchronization with an image displayed on the display 180.

For example, the signal processor 300 may include a first speaker unit 185*a* for outputting a first sound in a front direction, and a second speaker unit 185*b* for outputting a second sound in a direction to a ceiling 500.

In FIG. 1, speakers SFa and SFb of the first speaker unit 185*a* are arranged on the front of the signal processor 300, and array speakers SHa and SHb of the second speaker unit 185*b* are arranged on the top of the signal processor 300, by way of example.

Therefore, the first sound from the first speaker unit 185*a* is directed toward a user, and the second sound from the second speaker unit 185*b* is directed to the ceiling 500, reflected from the ceiling 500, and then reaches the user.

Preferably, the first sound and the second sound are output in different directions, causing no acoustic interference.

Particularly, to enhance the directionality of the second sound, the second speaker unit 185*b* may include the array speaker SHa and SHb with a plurality of speakers.

Meanwhile, an array speaker exhibits an excellent directionality relative to a general speaker. Accordingly, the use of the array speaker SHa and SHb may lead to reduction of acoustic interference between the first sound in the front direction and the second sound in the direction to the ceiling 500.

FIGS. 3A to 3D are exemplary views illustrating various shapes of the first and second bridge electrodes illustrated in FIG. 1.

Figure 3A:
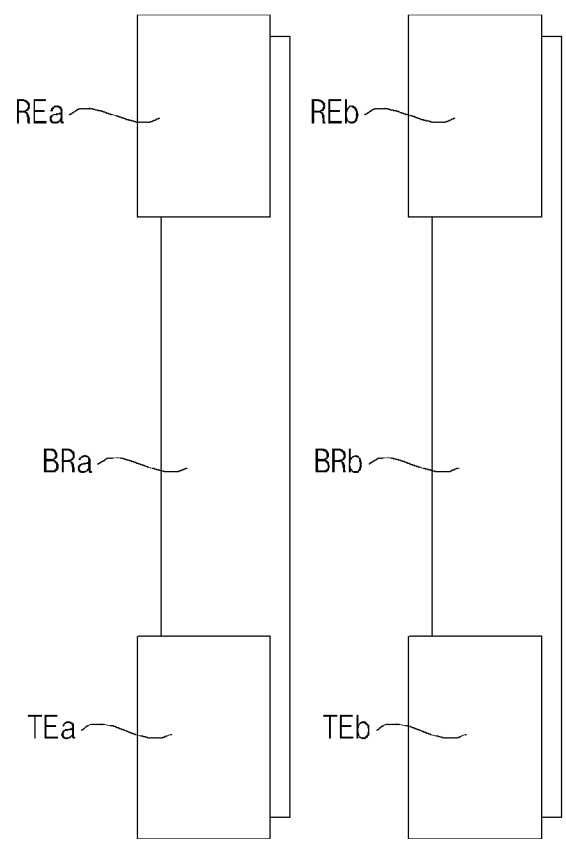
FIGS. 3A to 3D are exemplary views illustrating various shapes of first and second bridge electrodes illustrated in FIG. 1.

In the example of FIG. 3A, the widths of the first and second bridge electrodes BRa and BRb are uniform.

Particularly, the first and second bridge electrodes BRa and BRb are spaced from the first and second electrodes REa and REb arranged on the display 180 by a predetermined gap, and spaced from the third and fourth electrodes TEa and TEb in the signal processor 300 disposed under the display 180 by a predetermined gap.

As described before with reference to FIG. 1, the gap D between the first and second bridge electrodes BRa and BRb is preferably larger than the width C of the first bridge electrode BRa or the width C of the second bridge electrode BRb. Accordingly, wireless power may be efficiently transferred between the display 180 and the signal processor 300 which are apart from each other.

Figure 3B:
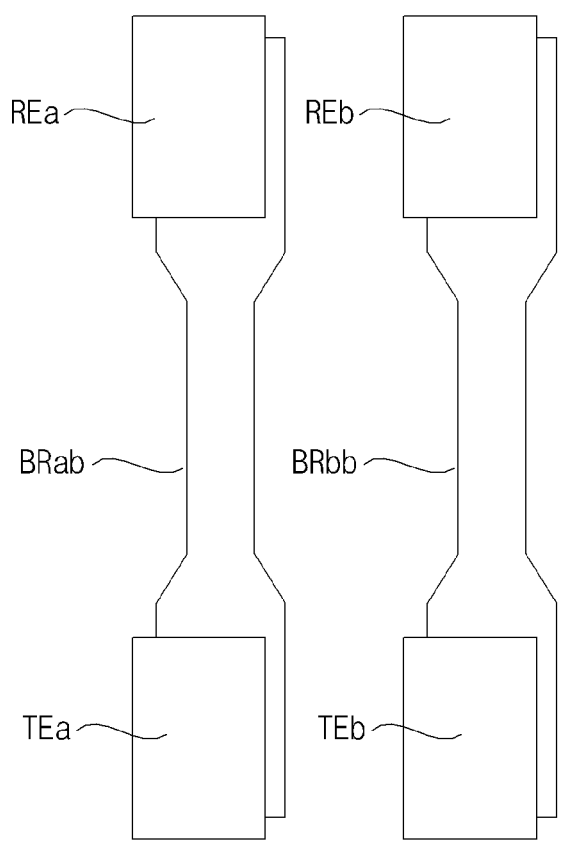
Figure 3C:
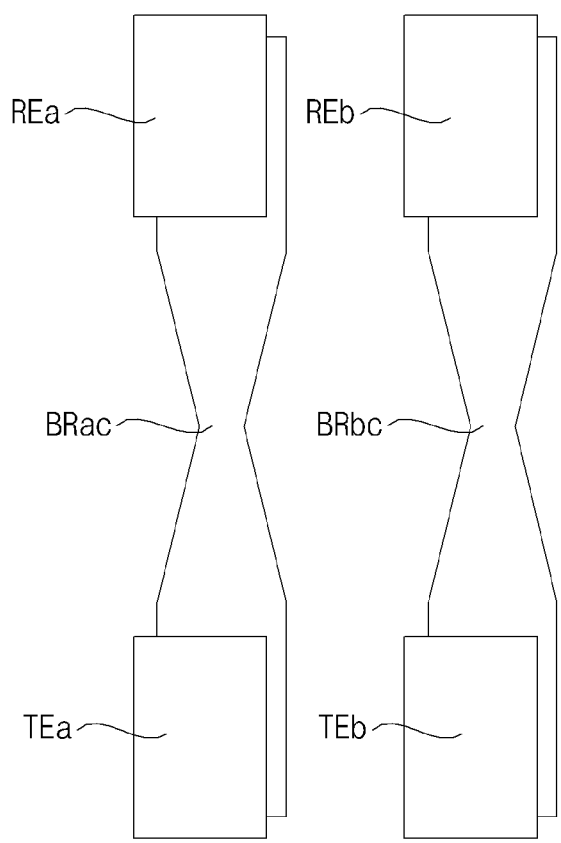
Figure 3D:
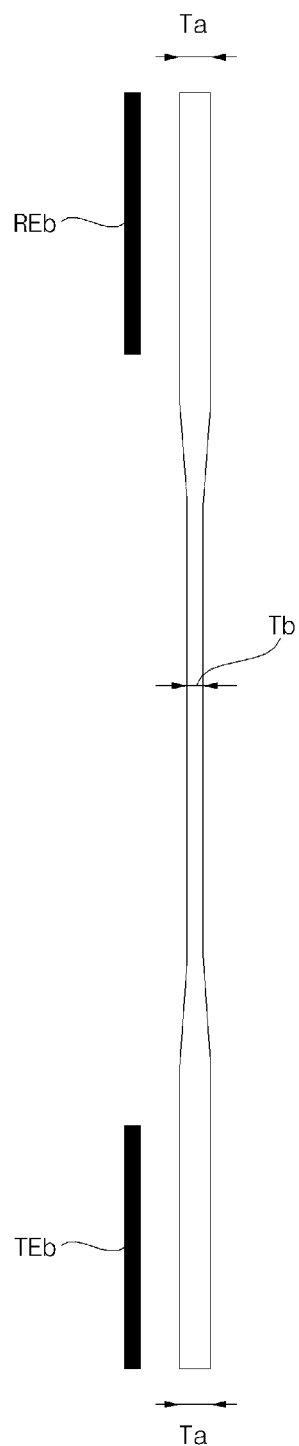

To enhance the aesthetic effect of the first and second bridge electrodes BRa and BRb which are colored, ensuring efficient wireless power transfer, it is also possible to diversify the shapes of the first and second bridge electrodes BRa and BRb, as illustrated in FIGS. 3B, 3C and 3D.

In the example of FIG. 3B, both ends of each of the first and second bridge electrodes BRa and BRb are wider than the center of the bridge electrode.

That is, one ends of the first and second bridge electrodes BRa and BRb, facing the first and second electrodes REa and REb and the other ends of the first and second bridge electrodes BRa and BRb, facing the third and fourth electrodes TEa and TEb may be wider than the centers of the first and second bridge electrodes BRa and BRb.

In this configuration, the widths of the centers of the first and second bridge electrodes BRa and BRb may be reduced down to a value that tolerates a withstanding voltage against a flowing current or voltage. If the center of each of the first and second bridge electrodes BRa and BRb is narrower in width than both ends of the bridge electrode, the first and second bridge electrodes BRa and BRb may be less noticeable to the user, thereby enhancing the aesthetic effect.

FIG. 3C illustrates an example of stepwise increasing the width of each of the first and second bridge electrodes BRa and BRb toward both ends thereof.

That is, the widths of the first and second bridge electrodes BRa and BRb are smallest at the centers thereof and are increased toward both ends thereof.

In other words, the widths of the first and second bridge electrodes BRa and BRb may be decreased toward the centers thereof. Similarly to FIG. 3B, the first and second bridge electrodes BRa and BRb may be less noticeable to the user, thereby enhancing the aesthetic effect.

FIG. 3D illustrates an example in which the thickness Tb of the center of each of the first and second bridge electrodes BRa and BRb is smaller than the thickness Ta of both ends thereof.

Thus, wireless power may be transferred efficiently through the first and second bridge electrodes BRa and BRb.

Unlike FIG. 3D, the first and second bridge electrodes BRa and BRb may become thicker stepwise toward both ends thereof.

That is, the thicknesses of the first and second bridge electrodes BRa and BRb are smallest at the centers thereof and are increased toward both ends thereof.

In other words, the first and second bridge electrodes BRa and BRb may become less thick toward the centers thereof. Thus, wireless power may be transferred efficiently through the first and second bridge electrodes BRa and BRb.

Figure 4:
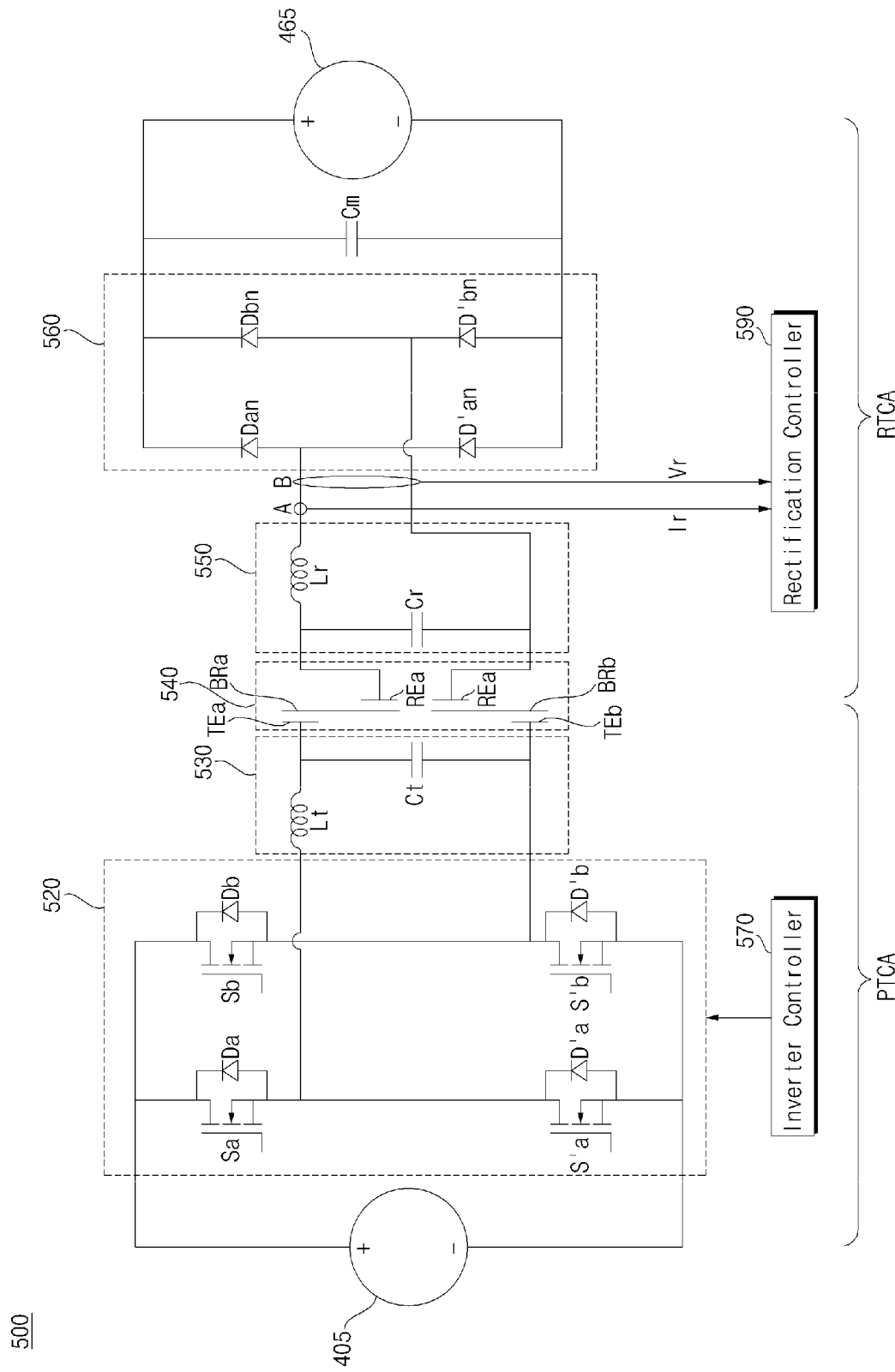
FIG. 4 is a circuit diagram illustrating an exemplary wireless power circuit unit according to an embodiment of the present disclosure.

FIG. 4 is a circuit diagram illustrating an exemplary wireless power circuit unit according to an embodiment of the present disclosure.

Referring to FIG. 4, a wireless power circuit unit 500 may include the power transmission circuit unit PTCA of the signal processor 300, the power reception circuit unit RTCA of the display 180, and the first and second bridge electrodes BRa and BRb.

The power transmission circuit unit PTCA may include an inverter 520 having a plurality of switching elements Sa, Sb, S'a, and S'b, to convert DC power to AC power, a first resonator 530 for resonating with the AC power received from the inverter 520, and an inverter controller 570 for controlling the inverter 520.

The inverter 520 includes the plurality of switching elements Sa, S'a, Sb, and S'b, and may convert DC power 405 to AC power of a predetermined frequency according to on/off of the switching elements Sa, S'a, Sb, and S'b, and output the AC power.

In the inverter 520, a pair of upper-arm switching elements Sa and Sb are connected serially, a pair of lower-arm switching elements S'a and S'b are connected serially, and two pairs of upper-arm and lower-arm switching elements Sa & S'a and Sb & S'b are connected in parallel. Anti-parallel diode elements Da, D'a, Db, and D'b are connected in reverse parallel to the respective switching elements Sa, S'a, Sb, and S'b.

Each of the switching elements of the inverter 520 is turned on/off based on an inverter switching control signal Sic received from the inverter controller 570.

The power transmission circuit unit PTCA may further include an output voltage detector to detect an output voltage of the inverter 520, or an output current detector to detect an out current of the inverter 520.

The inverter controller 570 may generate and output the inverter switching control signal Sic for controlling on/off of each switching element based on a voltage or current output from the output voltage detector or the output current detector.

The inverter 520 may also be referred to as a full bridge switching unit.

The first resonator 530 may be disposed at the output end of the inverter 520, and include an inductor it and a capacitor Ct.

The first resonator 530 may resonate by means of the inductor Lt and the capacitor Ct, and thus transmit wireless power by resonance.

The third and fourth electrodes TEa and TEb may be electrically connected to the output end of the first resonator 530.

The first and second bridge electrodes BRa and BRb may be arranged with the other ends thereof facing the third and fourth electrodes TEa and TEb, apart from the third and fourth electrodes TEa and TEb.

The display 180 may include the first and second electrodes REa and REb facing the one ends of the first and second bridge electrodes BRa and BRb, apart from the first and second bridge electrodes BRa and BRb.

The third and fourth electrodes TEa and TEb of the signal processor 300, the first and second electrodes REa and REb of the display 180, and the first and second bridge electrodes BRa and BRb may collectively referred to as a wireless charging unit 540.

The wireless charging unit 540 may perform CPT, using electrodes such as metal plates, as described before.

The power reception circuit unit RTCA of the display 180 may include a second resonator 550 for resonating with AC power received from the first and second electrodes REa and REb, and a rectifier 560 having a plurality of diode elements Dan, Dbn, D'an, D'bn, for rectifying the AC power received from the second resonator 550.

The second resonator 550 resonates by means of an inductor Lr and a capacitor Cr, thereby enabling wireless power transfer.

Particularly, the second resonator 550 resonates with wireless power received from the first and second electrodes REa and REb by the inductor Lr and the capacitor Cr, thereby outputting AC power to the rectifier 460.

The power reception circuit unit RTCA of the display 180 may further include a current detector A for detecting the current of the received AC power, or a voltage detector B for detecting the voltage of the received AC power.

The rectifier 560 includes the plurality of diode elements Dan, Dbn, D'an, D'bn and may rectify the received AC power. Particularly, the rectifier 560 may convert the received AC power to DC power and output the DC power.

In the rectifier 560, a pair of upper-arm diode elements Dan and Dbn are connected serially, a pair of lower-arm diode elements D'an and D'bn are connected serially, and two pairs of upper-arm and lower-arm diode elements Dan & D'an and Dbn & D'bn are connected in parallel.

The power reception circuit unit RTCA of the display 180 may include a rectification controller 590 for calculating received wireless power based on an input current or input voltage received from the current detector A or the voltage detector B.

For example, if the power calculated based on the detected current or voltage is equal to or less than a predetermined first value, the rectification controller 590 may control transmission of received power information to the signal processor 300.

In another example, when required power is equal to or greater than a predetermined second value, the rectification controller 590 may control transmission of required power information to the signal processor 300.

The power reception circuit unit RTCA of the display 180 may further include a capacitor Cm for storing rectified DC power received from the rectifier 560. The driving circuit unit DRA and the panel PAN of the display 180 operate based on the rectified DC power.

Figure 5:
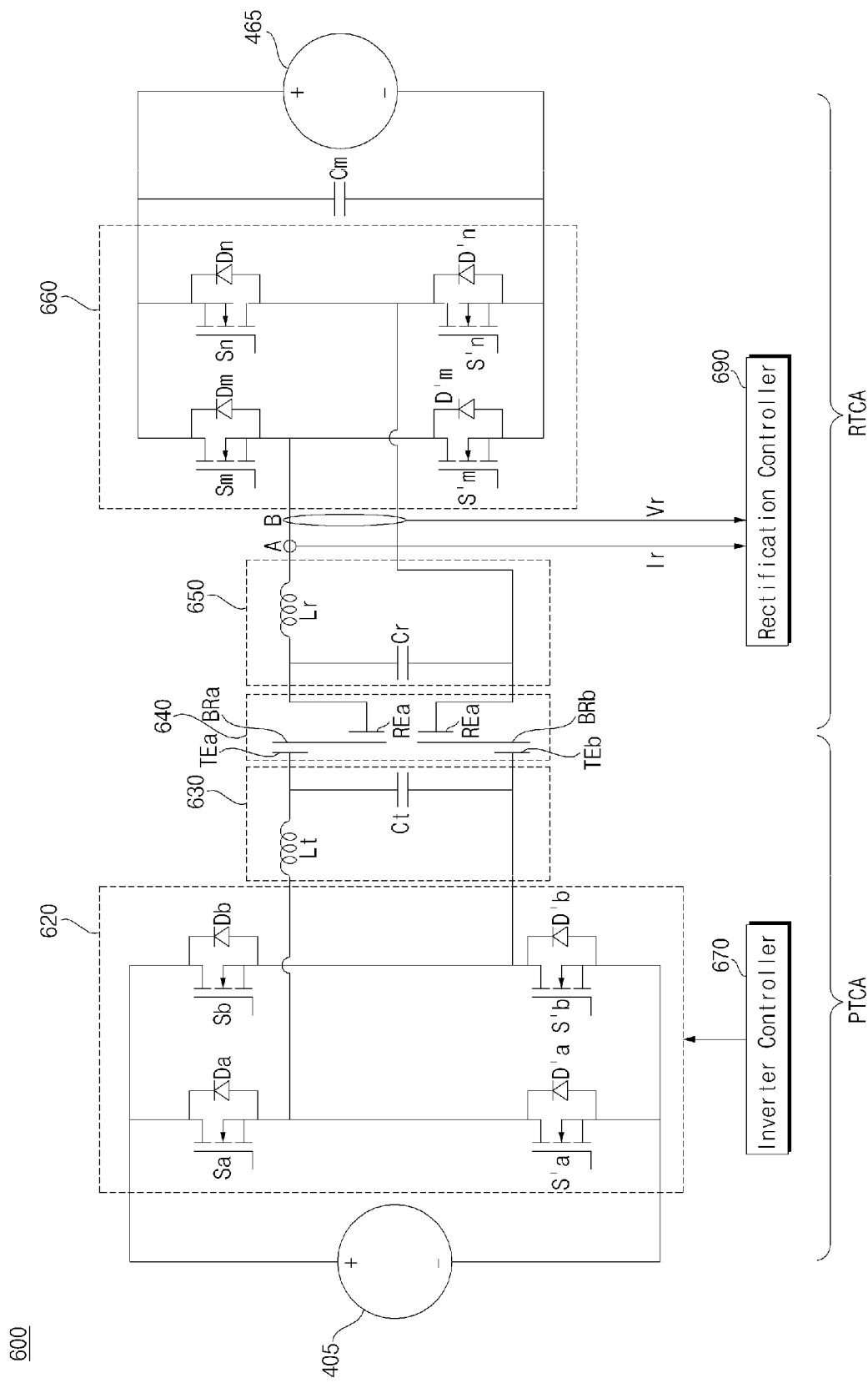
FIG. 5 is a circuit diagram illustrating another exemplary wireless power circuit unit according to an embodiment of the present disclosure.

FIG. 5 is a circuit diagram illustrating another exemplary wireless power circuit unit according to an embodiment of the present disclosure.

Referring to FIG. 5, a wireless power circuit unit 600 is similar to the wireless power circuit unit 500 illustrated in FIG. 4, except that a rectifier 660 includes a plurality of switching elements Sm, Sn, S'm, and S'n instead of the plurality of diode elements Dan, Dbn, D'an, and D'bn.

That is, the power transmission circuit unit PTCA of the signal processor 300 may include an inverter 620, a first resonator 630, and an inverter controller 670. The power reception circuit unit RTCA of the display 180 may include a second resonator 650 and the rectifier 660.

The following description focuses on the rectifier 660, with a description of the inverter 620, the first resonator 630, and the second resonator 650 omitted.

The rectifier 660 includes the plurality of switching elements Sm, Sn, S'm, and S'n, and may rectify AC power to DC power by continuous turn-off of the switching elements Sm, Sn, S'm, and S'n.

In the rectifier 660, a pair of upper-arm switching elements Sm and Sn are connected serially, a pair of lower-arm switching elements S'm and S'n are connected serially, and two pairs of upper-arm and lower-arm switching elements Sm & S'm and Sn & S'n are connected in parallel. Anti-parallel diode elements Dm, Dn, D'm, and D'n are connected in reverse parallel to the respective switching elements Sm, Sn, S'm, and S'n.

In FIG. 5, the same effect as achieved from the wireless power circuit unit 500 illustrated in FIG. 4 may be brought by the diode elements Dm, Dn, D'm, and D'n connected in reverse parallel to the respective switching elements Sm, Sn, S'm, and S'n. For this purpose, the switching elements Sm, Sn, S'm, and S'n are preferably kept in the off state, as described before.

According to the structure illustrated in FIG. 5, the inverter 620 of the power transmission circuit unit PTCA and the rectifier 660 of the power reception circuit unit RTCA are configured symmetrically to each other, thereby increasing the efficiency of wireless power transmission through impedance matching or the like.

Meanwhile, when power calculated based on a detected current or voltage is equal to or less than a predetermined first value, a rectification controller 690 may control the switching elements of the rectifier 660 to be turned on so as to transmit received power information to the signal processor 300. Herein, the rectifier 660 may discontinue rectification temporarily.

When required power is equal to or higher than a predetermined second value, the rectification controller 690 may control the switching elements of the rectifier 660 to be turned on so as to transmit required power information to the signal processor 300. Herein, the rectifier 660 may discontinue rectification temporarily.

Figure 6:
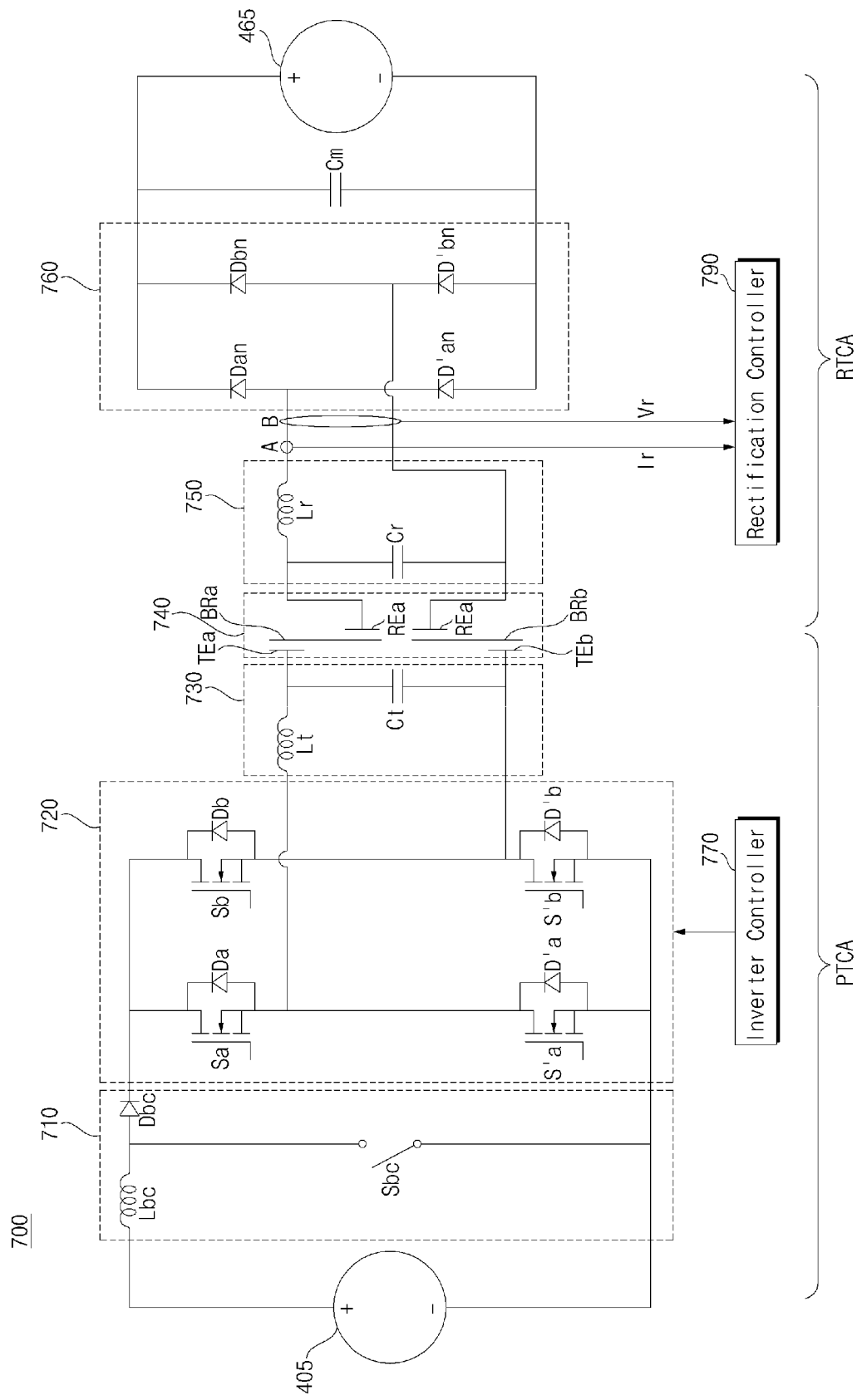
FIG. 6 is a circuit diagram illustrating another exemplary wireless power circuit unit according to an embodiment of the present disclosure.

FIG. 6 is a circuit diagram illustrating another exemplary wireless power circuit unit according to an embodiment of the present disclosure.

Referring to FIG. 6, a wireless power circuit unit 700 is similar to the wireless power circuit unit 500 illustrated in FIG. 4, except that the former further includes a converter 710 for power boosting, at a front end of the inverter.

That is, the power transmission circuit unit PTCA of the signal processor 300 may include the converter 710, an inverter 720, a first resonator 730, and an inverter controller 770. The power reception circuit unit RTCA of the display 180 may include a second resonator 750, a rectifier 760, and a rectification controller 790.

The following description focuses on the converter 710, with a description of the inverter 720, the first resonator 730, the second resonator 750, and the rectifier 760 omitted.

The converter 710 is a boost converter, and may include an inductor Lbc, a switching element Sbc, and a diode element Dbc.

Energy is stored in the inductor Lbc by turn-on of the switching element Sbc. As the switching element Sbc is turned off, a boosted current turns on the diode element Dbc and thus flows in the diode element Dbc by DC power and the energy stored in the inductor Lbc. Therefore, wireless power to be transmitted may be boosted.

The inverter controller 770 may control the converter 710, for power boosting. Specifically, the inverter controller 770 may control switching of the switching element Sbc in the converter 710.

For example, if power received at the display 180 is equal to or less than a predetermined first value, the inverter controller 770 may control boosting of the converter 710 based on received power information received from the display 180.

In another example, if power required for the display 180 is equal to or less than a predetermined second value, the inverter controller 770 may control boosting of the converter 710 based on required power information received from the display 180.

Figure 7:
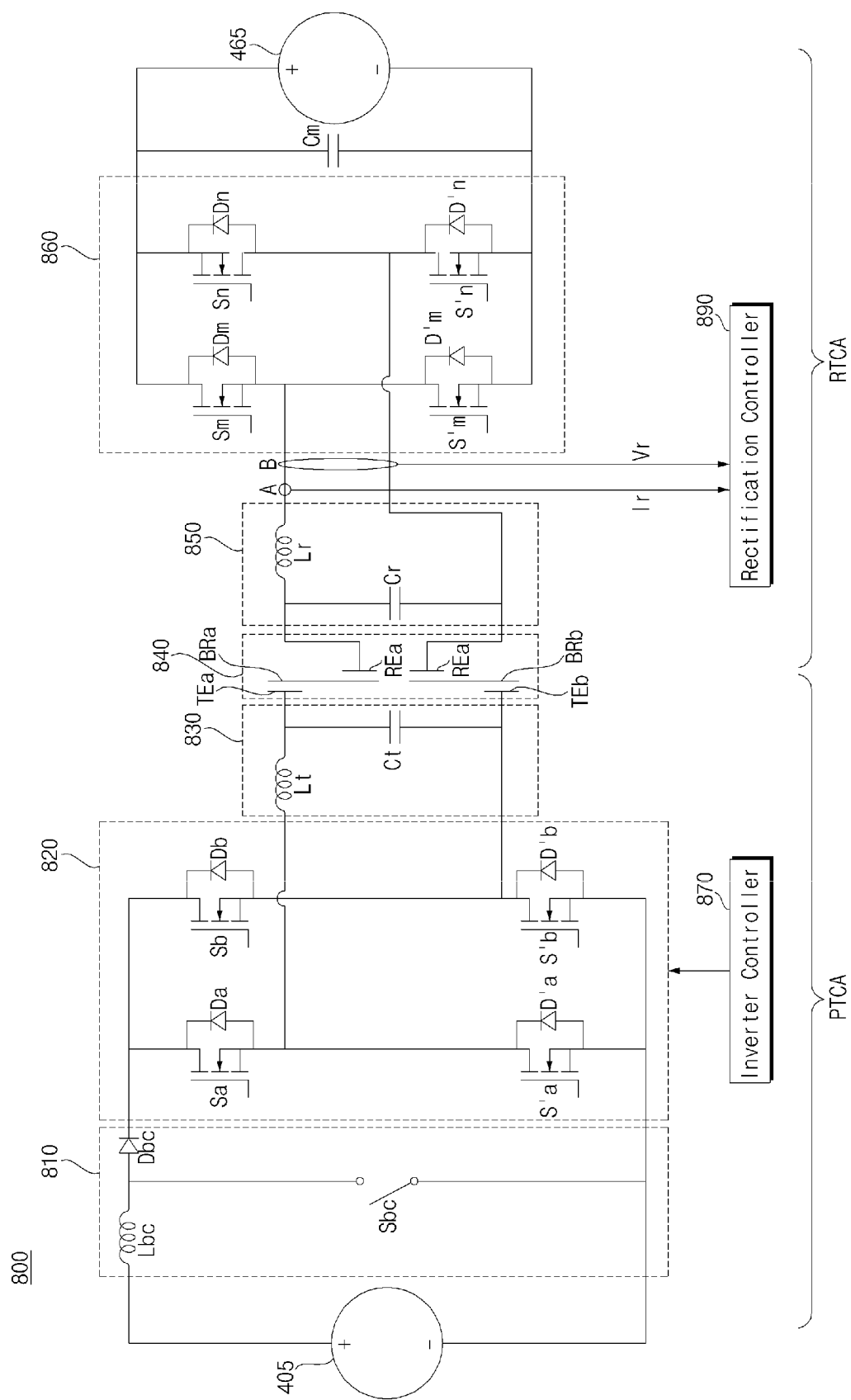
FIG. 7 is a circuit diagram illustrating another exemplary wireless power circuit unit according to an embodiment of the present disclosure.

FIG. 7 is a circuit diagram illustrating another exemplary wireless power circuit unit according to an embodiment of the present disclosure.

Referring to FIG. 7, a wireless power circuit unit 800 is similar to the wireless power circuit unit 700 illustrated in FIG. 6, except that a rectifier 860 includes a plurality of switching elements Sm, Sn, S'm, and S'n instead of the plurality of diode elements Dan, Dbn, D'an, and D'bn.

That is, the power transmission circuit unit PTCA of the signal processor 300 may include a converter 810, an inverter 820, a first resonator 830, and an inverter controller 870. The power reception circuit unit RTCA of the display 180 may include a second resonator 850 and the rectifier 860.

The following description focuses on the rectifier 860, with a description of the inverter 820, the first resonator 830, and the second resonator 850 omitted.

The rectifier 860 includes the plurality of switching elements Sm, Sn, S'm, and S'n, and may rectify AC power to DC power by continuous turn-off of the switching elements Sm, Sn, S'm, and S'n.

In the rectifier 860, a pair of upper-arm switching elements Sm and Sn are connected serially, a pair of lower-arm switching elements S'm and S'n are connected serially, and two pairs of upper-arm and lower-arm switching elements Sm & S'm and Sn & S'n are connected in parallel. Anti-parallel diode elements Dm, Dn, D'm, and D'n are connected in reverse parallel to the respective switching elements Sm, Sn, S'm, and S'n.

In FIG. 7, the same effect as achieved from the wireless power circuit unit 700 illustrated in FIG. 6 may be brought by the diode elements Dm, Dn, D'm, and D'n connected in reverse parallel to the respective switching elements Sm, Sn, S'm, and S'n. For this purpose, the switching elements Sm, Sn, S'm, and S'n are preferably kept in the off state, as described before.

According to the structure illustrated in FIG. 7, the inverter 820 of the power transmission circuit unit PTCA and the rectifier 860 of the power reception circuit unit RTCA are configured symmetrically to each other, thereby increasing the efficiency of wireless power transmission through impedance matching or the like.

Meanwhile, when power calculated based on a detected current or voltage is equal to or less than a predetermined first value, a rectification controller 890 may control the switching elements of the rectifier 860 to be turned on so as to transmit received power information to the signal processor 300. Herein, the rectifier 860 may discontinue rectification temporarily.

When required power is equal to or greater than a predetermined second value, the rectification controller 890 may control the switching elements of the rectifier 860 to be turned on so as to transmit required power information to the signal processor 300. Herein, the rectifier 860 may discontinue rectification temporarily.

Meanwhile, the display 180 may add a modulation signal including state information or control information by changing the capacitance of a capacitor Cr in the second resonator 850.

For example, the rectification controller 890 may control execution of a rectification mode, using the anti-parallel diodes of the plurality of switching elements Sm, Sn, S'm, and S'n by turning off the plurality of switching elements Sm, Sn, S'm, and S'n during wireless power reception, and may control execution of an information transmission mode instead of the rectification mode, for transmission of state information or control information.

Specifically, the rectification controller 890 may control switching of the plurality of switching elements Sm, Sn, and S'n, thereby controlling a resonant frequency of the second resonator 850 to be changed.

The rectification controller 890 may control transmission of a modulation signal including state information or control information to the signal processor 300, using the change of the resonant frequency of the second resonator 850.

If the resonant frequency is changed, an effect equivalent to a change of the capacitance of the capacitor Cr may be produced.

Meanwhile, the state information or control information may include at least one of calculated received power information, required power information, power transmission request information, power transmission discontinuation information, received voltage information, and received current information.

The signal processor 300 may extract the modulation signal based on current detection or voltage detection based on wireless power transmission.

That is, the modulation signal from the display 180 may be detected by the current detector or voltage detector of the signal processor 300 in the image display apparatus 100.

The inverter controller 870 of the signal processor 300 may extract the state information or control information from the modulation signal. Therefore, the inverter controller 870 of the signal processor 300 may acquire the state information or control information.

Meanwhile, the display 180 and the signal processor 300 may exchange the state information or control information at a different frequency from a frequency used for wireless power transfer.

For example, the frequency used for wireless power transfer may be 3 to 4 MHz, and the frequency used for transmission of the state information or control information may be a few GHz.

That is, the state information or control information may be transmitted in a different communication scheme from that of wireless power transfer through the first and second bridge electrodes. For example, the state information or control information may be transmitted in a different wireless communication scheme such as Bluetooth or WiFi.

Meanwhile, if received wireless power is greater than required consumption power, the display 180 may operate the switching elements of the rectifier 860 so that part of the received wireless power may be consumed.

For example, if received wireless power is greater than required consumption power, excessive consumption power causes an excessive current to flow in the circuit elements of the display 180. As a result, the circuit elements are vulnerable to damage.

In the present disclosure, to avert the above problem, if received wireless power is greater than required consumption power for the display 180, power may be consumed for the plurality of switching elements Sm, Sn, S'm, and S'n by turning on all of the switching elements Sm, Sn, S'm, and S'n, thereby preventing damage to the circuit elements of the display 180.

Figure 8:
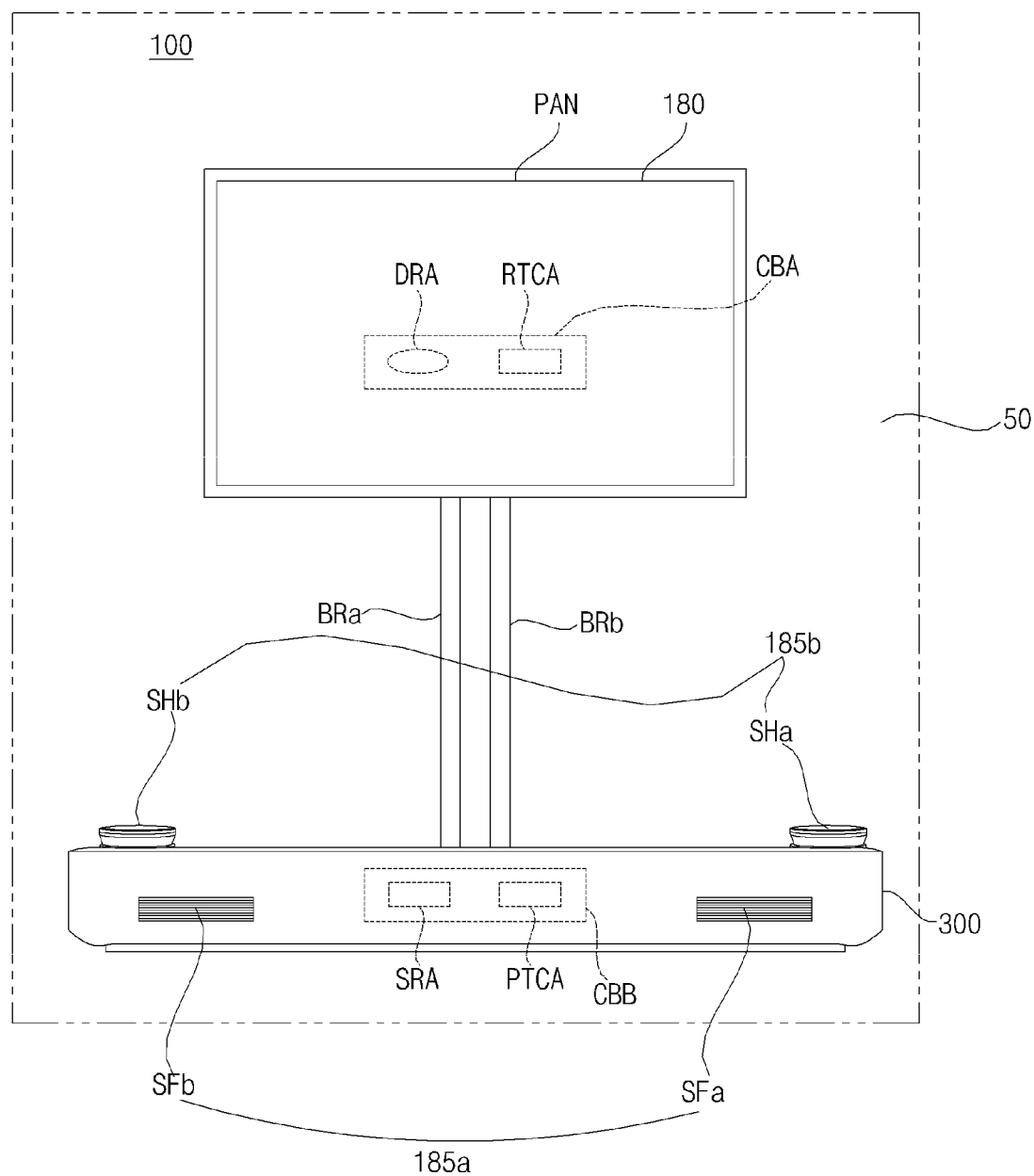
FIG. 8 is a view illustrating internal circuit boards inside a signal processor and a display illustrated in FIG. 1.

FIG. 8 is a view illustrating internal circuit boards in the signal processor and the display illustrated in FIG. 1.

Referring to FIG. 8, the image display apparatus 100 is identical to the image display apparatus 100 illustrated in FIG. 1, except that the circuit board CBB not shown in FIG. 1 is shown in the signal processor 300.

As described before with reference to FIG. 1, the signal processor 300 may include the circuit board CBB for transmitting wireless power to the display 180.

The circuit board CBB may include the signal processing circuit unit SRA for performing a signal process on a video signal, and the power transmission circuit unit PTCA for wireless power transmission.

The power transmission circuit unit PTCA may be any of the power transmission circuits illustrated in FIGS. 4 to 7.

Figure 9:
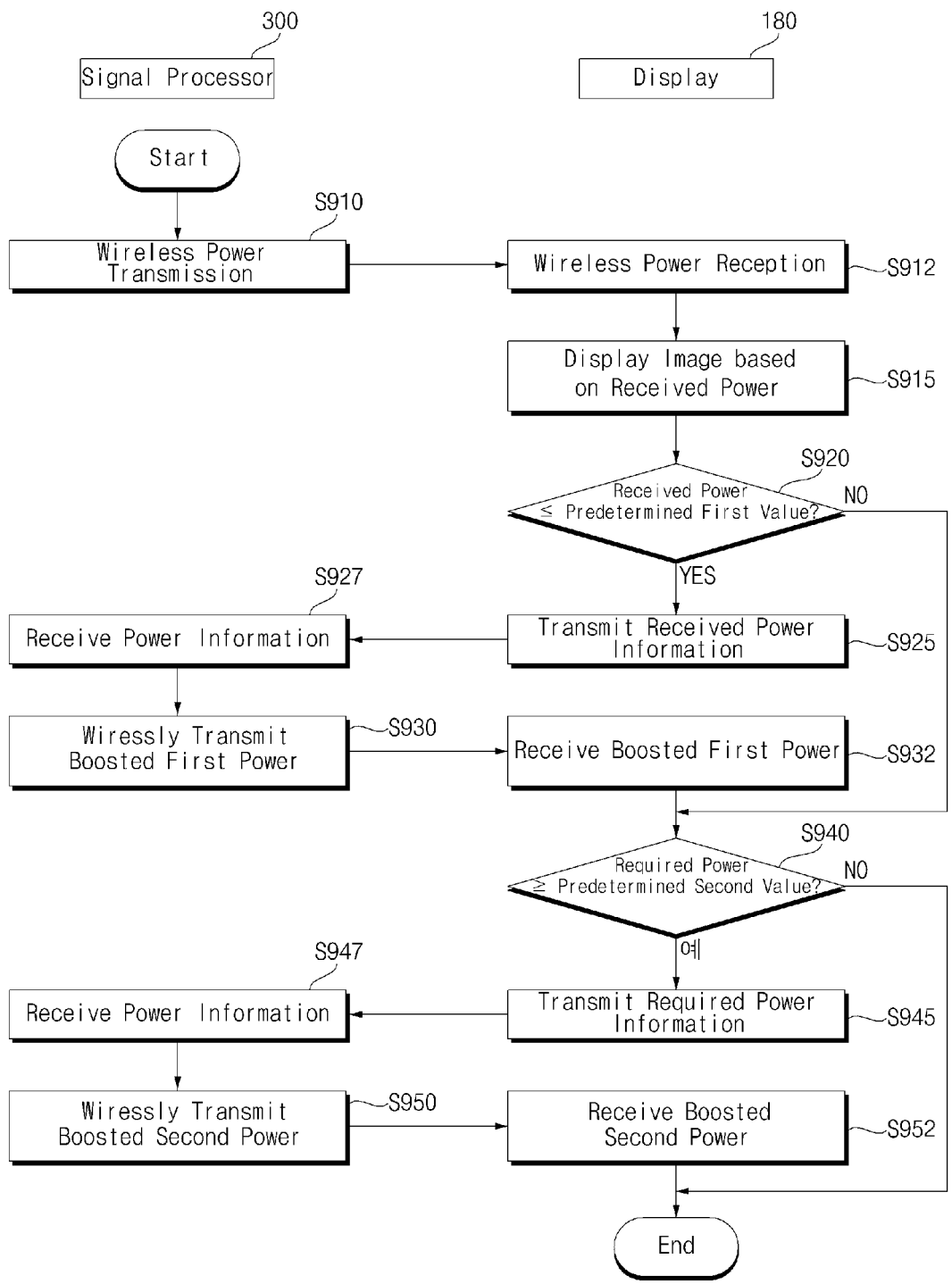
FIG. 9 is a flowchart illustrating a method for operating an image display apparatus according to an embodiment of the present disclosure.

FIG. 9 is a flowchart illustrating a method for operating an image display apparatus according to an embodiment of the present disclosure, and FIGS. 10A to 10E are views referred to for describing the operation method illustrated in FIG. 9.

Referring to FIG. 9 first, the signal processor 300 of the image display apparatus 100 transmits wireless power (S910). In response, the display 180 of the image display apparatus 180 receives the wireless power (S912).

As described before, the image display apparatus 100 performs wireless power transfer by means of the first and second bride electrodes BRa and BRb having one ends facing the first and second electrodes REa and REb, apart from the first and second electrodes REa and REb and the other ends facing the third and fourth electrodes TEa and TEb, apart from the third and fourth electrodes TEa and TEb.

Preferably, the gap D between the first and second bridge electrodes BRa and BRb is larger than the width C of the first or second bridge electrode BRa or BRb. The resulting reduction of interference between the first and second bridge electrodes BRa and BRb may increase the efficiency of wireless power transfer.

For wireless power transmission, the signal processor 300 of the image display apparatus 100 may include the inverter 520, 620, 720, or 820, the first resonator 530, 630, 730, or 830, the converter 810, and the inverter controller 570, 670, 770, or 870, as illustrated in FIGS. 4 to 7.

For wireless power reception, the display 180 of the image display apparatus 100 may include the second resonator 550, 650, 750, or 850, the rectifier 560, 660, 760, or 860, and the rectification controller 590, 690, 790, or 890, as illustrated in FIGS. 4 to 7.

Subsequently, the display 180 of the image display apparatus 100 displays an image using the received wireless power (S915).

Figure 10A:
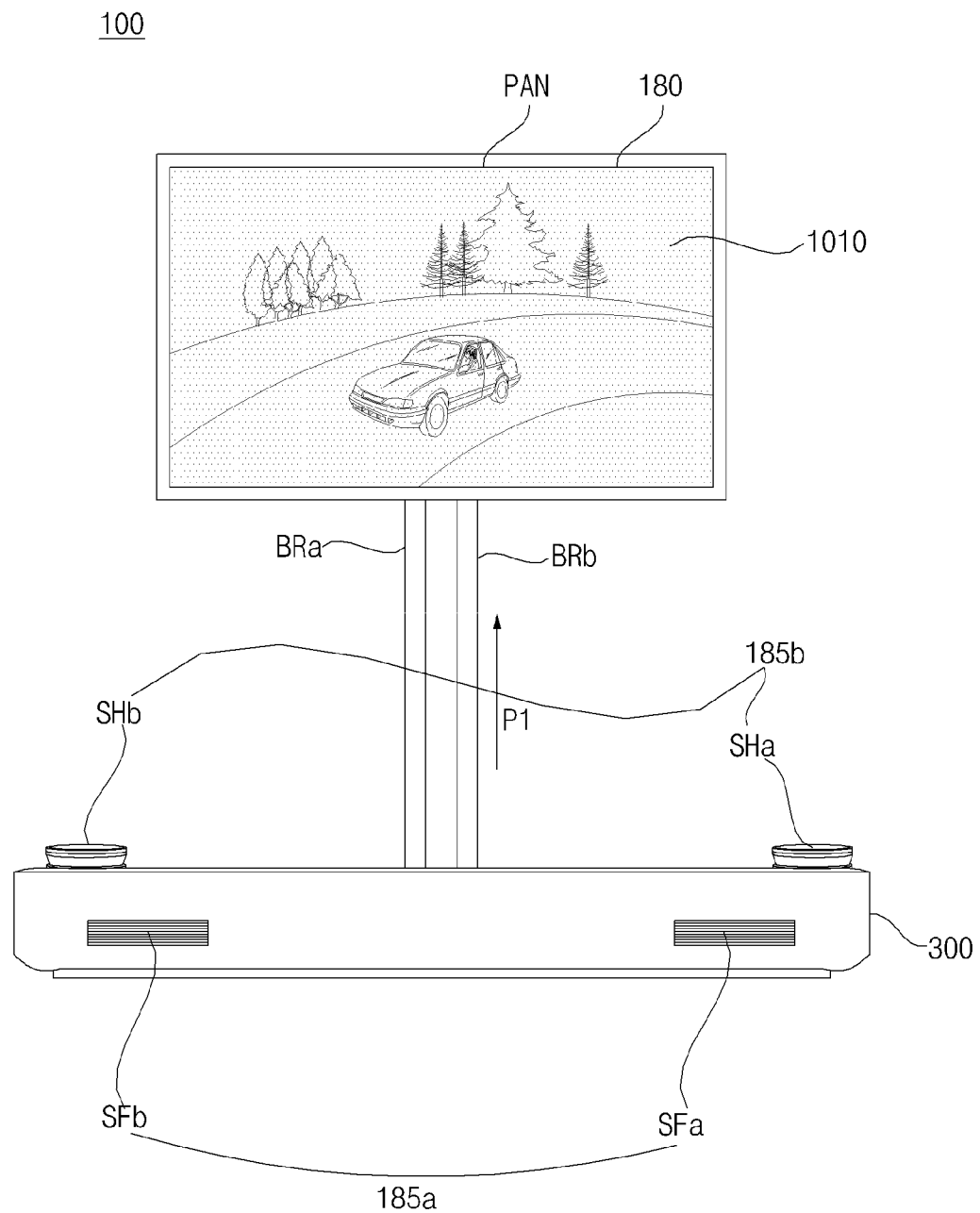
FIGS. 10A to 10E are views referred to for describing the operation method illustrated in FIG. 9.

FIG. 10A is an exemplary view illustrating wireless transmission of power P1 from the signal processor 300 to the display 180 and display of a specific image 1010 on the panel PAN of the display 180 using the received power P1 in the image display apparatus 100.

For example, the power P1 transmitted from the signal processor 300 to the display 180 may be about tens of W to hundreds of W.

Specifically, if the panel PAN of the display 180 is a 50-inch or larger panel, the power P1 supplied to the display 180 may be hundreds of W.

Then, the display 180 of the image display apparatus 100 determines whether the received power is equal to or greater than a predetermined first value (S920). If the received power is equal to or less than the predetermined first value, the display 180 may transmit received power information to the signal processor 300 of the image display apparatus 100 (S925). For example, the power reception circuit unit RTCA of the display 180 may include the current detector A for detecting the current of the received AC power or the voltage detector B for detecting the voltage of the received AC power, as illustrated in FIGS. 4 to 7.

The rectification controller 590 may calculate received wireless power based on an input current or voltage from the current detector A or the voltage detector B.

If the received wireless power calculated based on the detected current or voltage is equal to or less than the predetermined first value, the rectification controller 590 may control transmission of received power information to the signal processor 300.

Figure 10B:
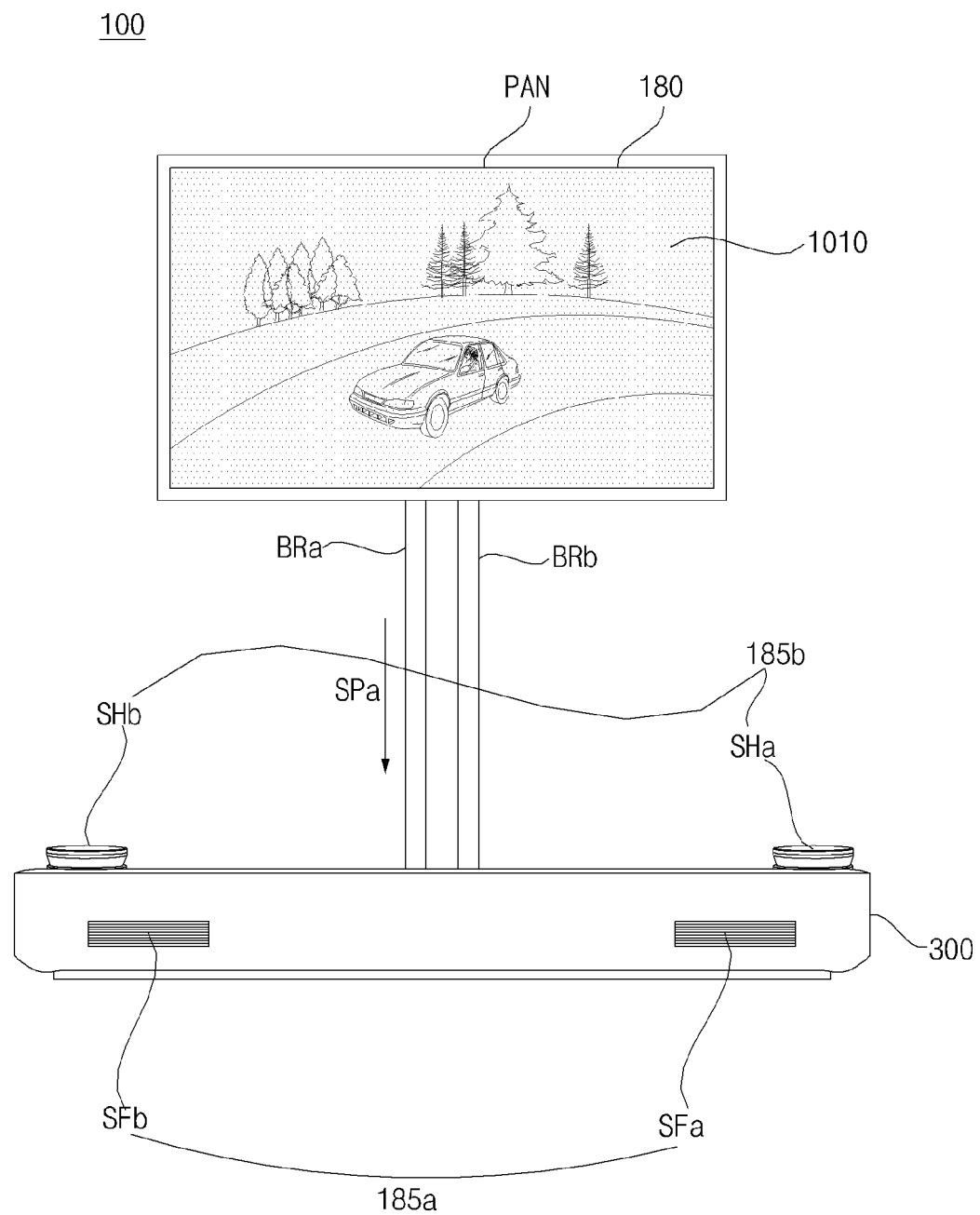

FIG. 10B is an exemplary view illustrating transmission of received power information Spa from the display 180 to the signal processor 300 in the image display apparatus 100.

To transmit the received power information SPa, the display 180 of the image display apparatus 100 may control turn-on of the switching elements of the rectifier 660, as illustrated in FIG. 5. Herein, the rectifier 660 may discontinue rectification temporarily.

Subsequently, the signal processor 300 may receive the received power information from the display 180 in the image display apparatus 100 (S927), and may wirelessly transmit boosted first power by operating the converter and so on to increase the level of wireless power to be transmitted (S930). In response to the power transmission, the display 180 may receive the boosted first power (S932).

As illustrated in FIG. 6, the converter 710 may include the inductor Lbc, the switching element Sbc, and the diode element Dbc, as a boost converter.

As the switching element Sbc is turned on, energy is stored in the inductor Lbc, and as the switching element Sbc is turned off, a current boosted by the energy stored in the inductor Lbc turns on the diode element Dbc and flows through the diode element Dbc. Therefore, wireless power to be transmitted may be boosted.

Meanwhile, the inverter controller 770 may control the converter 710, for power boosting. Specifically, the inverter controller 770 may control switching of the switching element Sbc of the converter 710.

For example, the inverter controller 770 may control boosting of the converter 710 based on received power information which is received from the display 180, if power received at the display 180 is equal to or less than the predetermined first value.

Herein, as the difference between the received power and the predetermined first value is larger, the inverter controller 770 may control the level of boosted power to be higher.

Figure 10C:
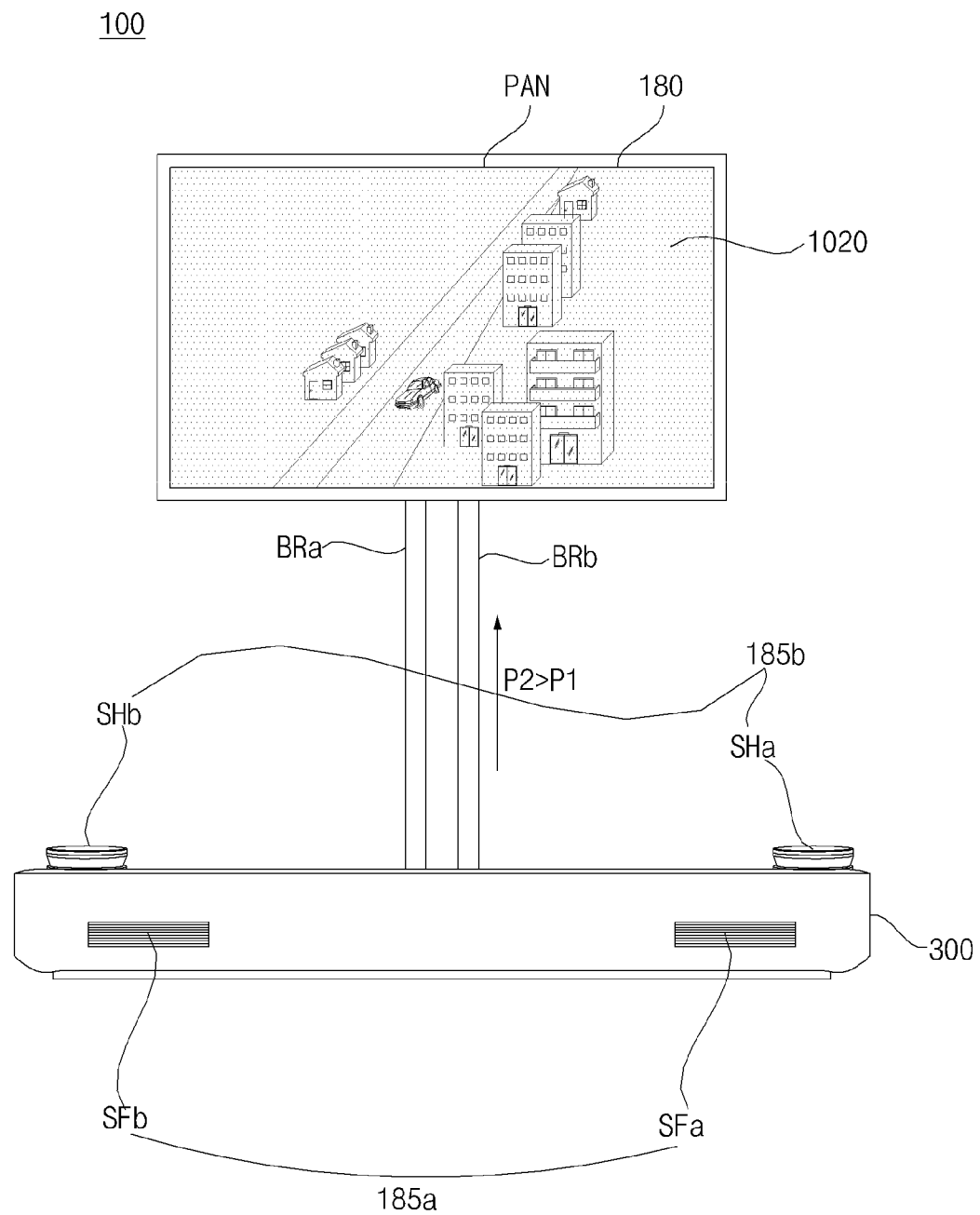

FIG. 10C is an exemplary view illustrating wireless transmission of boosted power P2 from the signal processor 300 to the display 180 and display of a predetermined image 1020 on the panel PAN of the display 180, using the received power P2 in the image display apparatus 100. Thus, the image may be displayed stably.

Subsequently, the display 180 determines whether power required for image display is equal to or greater than a predetermined second value (S940). If the power required for image display is equal to or greater than the predetermined second value, the display 180 may transmit required power information to the signal processor 300 (S945).

For example, the display 180 may calculate required power according to information about the luminance of an image to be displayed. When the calculated required power is equal to or greater than the predetermined second value, the display 180 may transmit required power information to the signal processor 300.

Particularly, when the calculated required power is equal to or greater than the predetermined second value, the rectification controller 590 may control transmission of required power information to the signal processor 300.

Figure 10D:
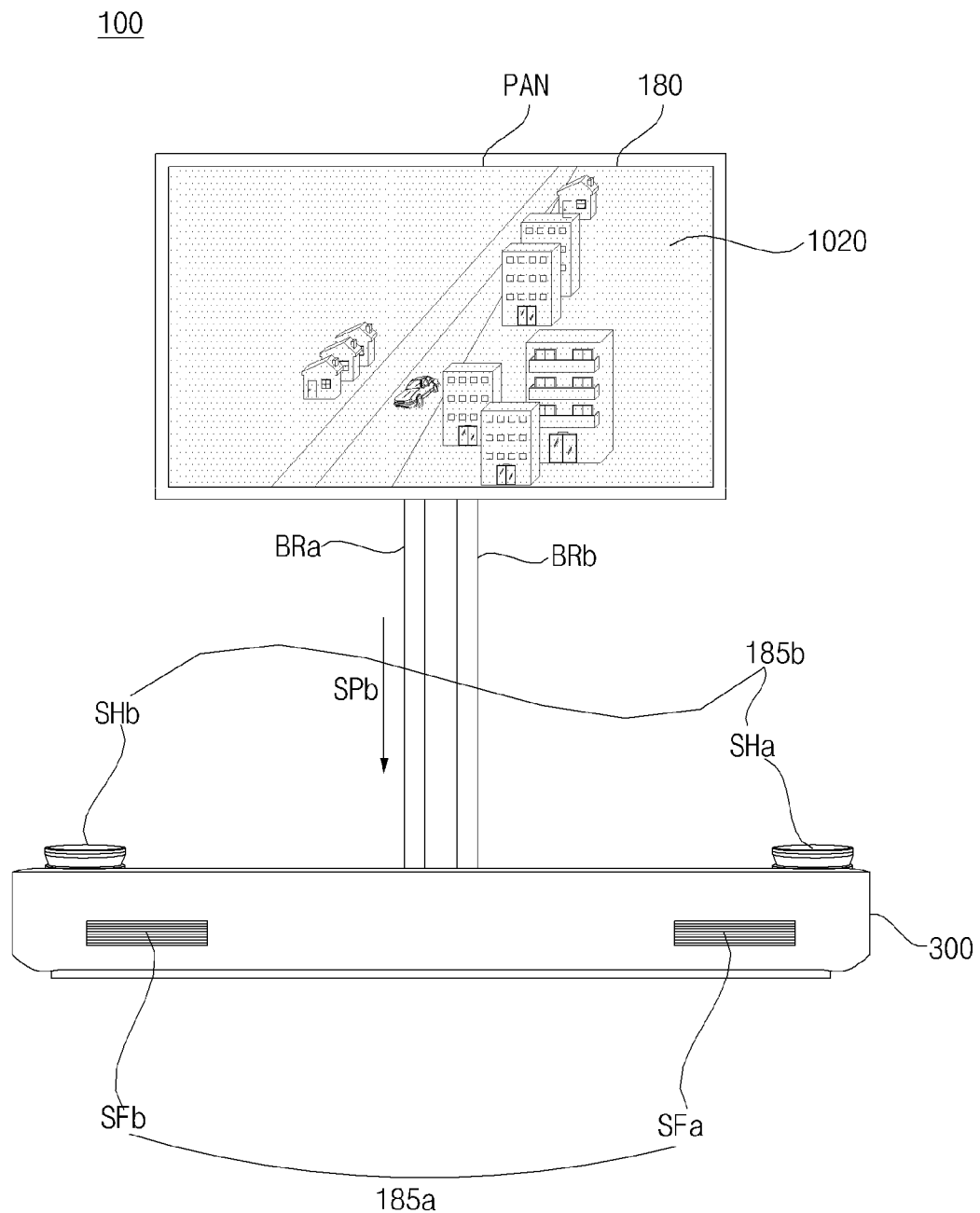

FIG. 10D is an exemplary view illustrating transmission of required power info notion Spb from the display 180 to the signal processor 300 in the image display apparatus 100.

For transmission of the required power information Spb, the display 180 of the image display apparatus 100 may control turn-on of the switching elements of the rectifier 660, as illustrated in FIG. 5. Herein, the rectifier 660 may discontinue rectification temporarily.

Subsequently, the signal processor 300 may receive the received power information from the display 180 in the image display apparatus 100 (S947), and may wirelessly transmit boosted second power by operating the converter and so on to increase power during wireless power transmission (S950). In response, the display 180 may receive the boosted second power (S952).

As illustrated in FIG. 6, with the switching element Sbc turned on, energy is stored in the inductor Lbc, and with the switching element Sbc turned off, a boosted current turns on the diode element Dbc and thus flows in the diode element Dbc, by DC power and the energy stored in the inductor Lbc. Therefore, wireless power to be transmitted may be boosted.

Meanwhile, the inverter controller 770 may control the converter 710, for power boosting. Specifically, the inverter controller 770 may control switching of the switching element Sbc of the converter 710.

For example, the inverter controller 770 may control boosting of the converter 710 based on required power information which is received from the display 180, if power required for the display 180 is equal to or less than the predetermined second value.

Herein, as the difference between the required power and the predetermined second value is larger, the inverter controller 770 may control the level of boosted power to be higher.

Figure 10E:
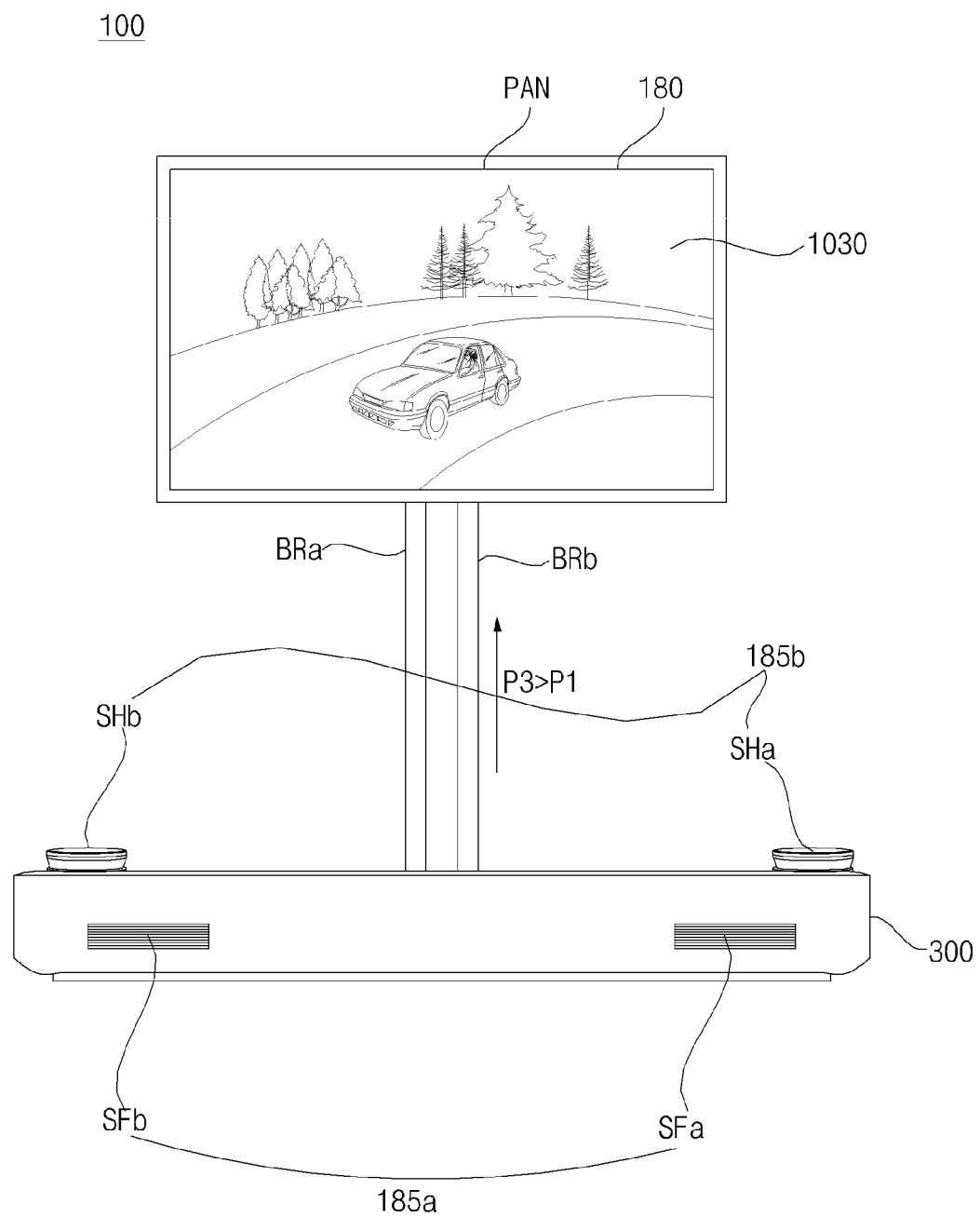

FIG. 10E is an exemplary view illustrating wireless transmission of boosted power P3 from the signal processor 300 to the display 180, and display of a predetermined image 1030 on the panel PAN of the display 180 in the image display apparatus 100. Thus, the image 1030 which has high luminance and thus is bright may be displayed stably.

Figure 11:
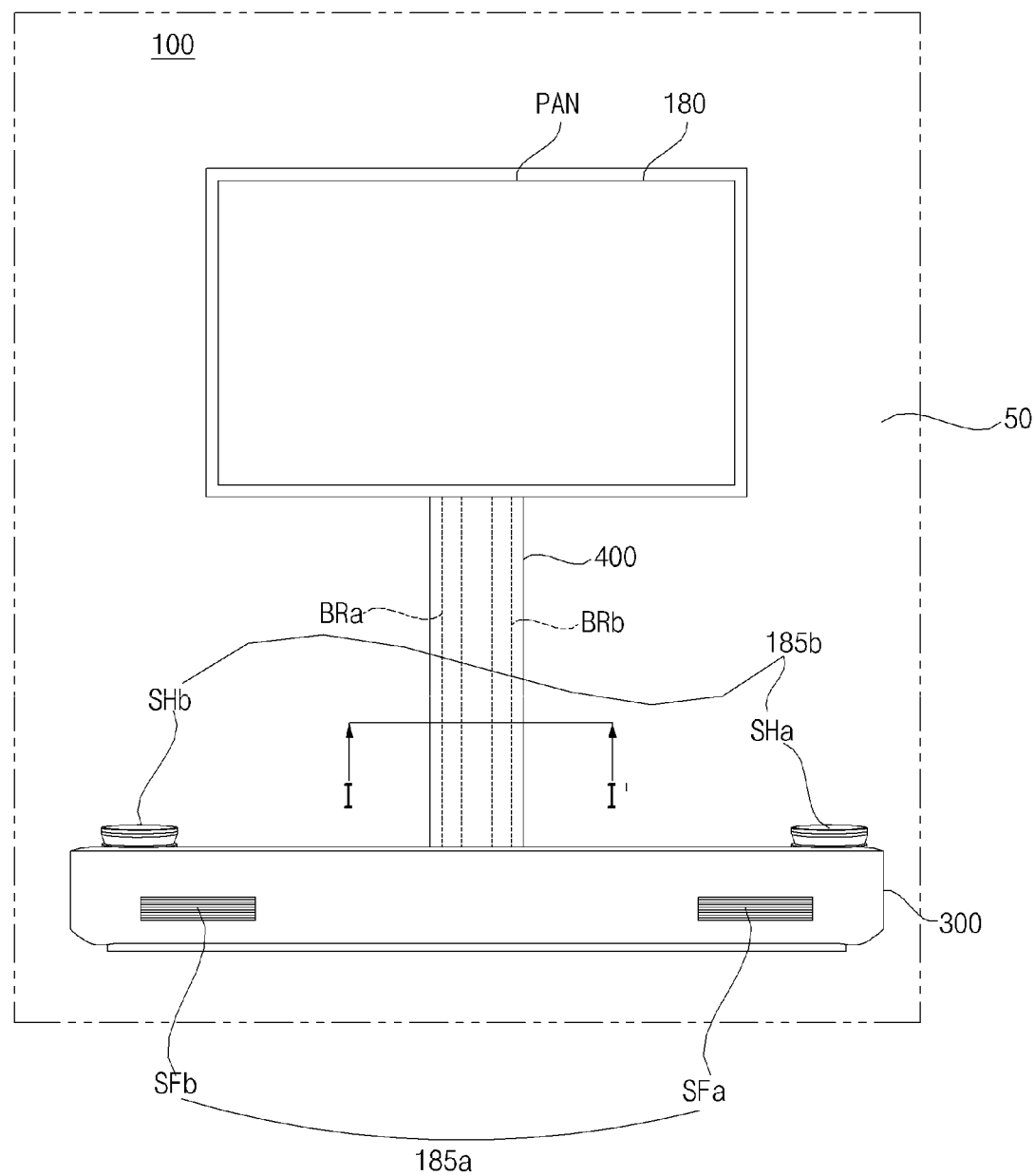
FIG. 11 is a view illustrating an image display apparatus according to another embodiment of the present disclosure.

FIG. 11 is a view illustrating an image display apparatus according to another embodiment of the present disclosure.

Referring to FIG. 11, similarly to the image display apparatus 100 illustrated in FIG. 1, an image display apparatus 100b includes the display 180, the signal processor 300, and the first and second bride electrodes BRa and BRb having one ends facing the first and second electrodes REa and REb, apart from the first and second electrodes REa and REb and the other ends facing the third and fourth electrodes TEa and TEb, apart from the third and fourth electrodes TEa and TEb. The gap D between the first and second bride electrodes BRa and BRb is larger than the width C of the first bride electrode BRa or the width C of the second bridge electrode BRb.

The image display apparatus 100b illustrated in FIG. 11 differs from the image display apparatus 100 illustrated in FIG. 1, in that the former further includes an optical sheet 400 attached on the first and second bridge electrodes BRa and BRb.

Particularly, to hide the first and second bridge electrodes BRa and BRb between the display 180 and the signal processor 300, the optical sheet 400 having Fresnel patterns formed thereon is adopted in the present disclosure.

The optical sheet 400 includes Fresnel patterns 410a and 410b formed on the first and second bridge electrodes BRa and BRb, and transparent barriers BWo, BWa, and BWb formed under the first and second bridge electrodes BRa and BRb. Each of the Fresnel patterns 410a and 410b has a plurality of mountains Pm and a plurality of valleys Pv, and the difference between the height of a mountain Pm and the depth of a valley Pv becomes smaller from the first and second bridge electrodes BRa and BRb toward the transparent barriers BWo, BWa, and BWb. Therefore, the first and second bridge electrodes BRa and BRb are not noticed to the user facing the fronts of the first and second bridge electrodes BRa and BRb. Instead, the transparent barriers BWo, BWa, and BWb may be perceived to the user. Thus, the first and second bridge electrodes BRa and BRb between the display 180 and the signal processor 300 may look transparent.

The same effect as achieved by a lens is produced by the Fresnel patterns 410a and 410b. Particularly, virtual lines CURa and CURb connecting the plurality of valleys are a non-spherical curve. As the depths of the valleys increase from the transparent barriers BWo, BWa, and BWb toward the first and second bridge electrodes BRa and BRb, the refractive index of light increases. As a result, not the first and second bridge electrodes BRa and BRb but the transparent barriers BWo, BWa, and BWb are seen from across from the fronts of the first and second bridge electrodes BRa and BRb, which will be described below in more detail with reference to FIG. 12.

Meanwhile, the signal processor 300 may transmit a pointer image based on motion information about a remote controller (200 in FIG. 17A) to the display 180. Therefore, the pointer image may be displayed on the display 180.

The signal processor 300 may include the first speaker unit 185a for outputting a first sound in a front direction, and the second speaker unit 185b for outputting a second sound in the direction to the ceiling 500.

Figure 12:
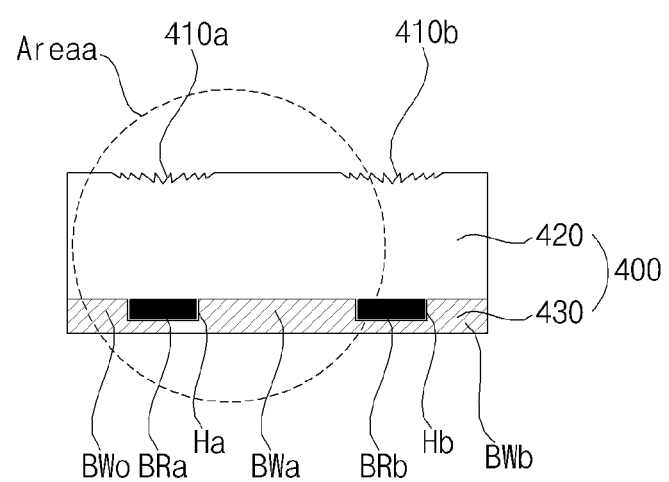
FIG. 12 is an exemplary sectional view illustrating the image display apparatus illustrated in FIG. 11, taken along line I-I'.
Figure 13:
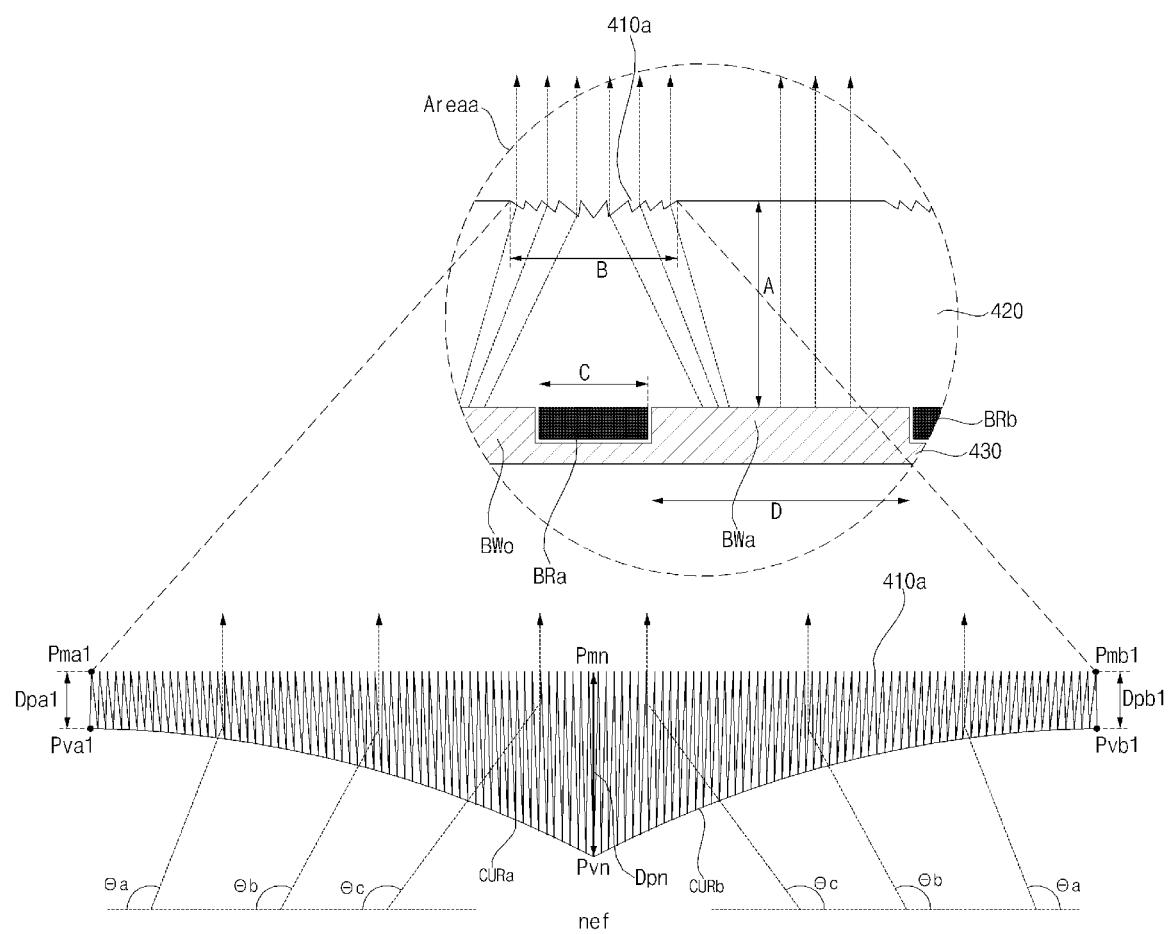
FIG. 13 is an enlarged view illustrating an area Areaa illustrated in FIG. 12.

FIG. 12 is an exemplary sectional view illustrating the image display apparatus illustrated in FIG. 11, taken along line I-I', and FIG. 13 is an enlarged view illustrating an area Areaa illustrated in FIG. 12.

Referring to FIGS. 12 and 13, the optical sheet 400 illustrated in FIG. 12 may include the Fresnel patterns 410a and 410b formed on the first and second bridge electrodes BRa and BRb, and the transparent barriers BWo, BWa, and BWb formed under the first and second bridge electrodes BRa and BRb.

Referring to FIG. 12, the optical sheet 400 may include recesses Ha and Hb on the transparent barriers BWa, BWo, and BWb, or 430, and the first and second bridge electrodes BRa and BRb may be placed in the recesses Ha and Hb.

The optical sheet 400 may include a base 420 formed on the transparent barriers BWo, BWa, and BWb and the first and second electrodes BRa and BRb, and the plurality of Fresnel patterns 410a and 410b formed on the base 420.

Each of the Fresnel pattern 410a and 410b includes a plurality of mountains Pma1 to Pmn or Pmb1 to Pmn and a plurality of valleys Pva1 to Pvn or Pvb1 to Pvn. The Fresnel patterns 410a and 410b are characterized in that the differences Dpn to Dpa1 and Dpn to Dpb1 between the heights of the mountains Pma1 to Pmn and Pmb1 to Pmn and the depths of the valleys Pva1 to Pvn and Pvb1 to Pvn become smaller from the first and second bridge electrodes BRa and BRb toward the transparent barriers BWo, BWa, and BWb.

Particularly, the differences DPn to Dpa1 and Dpn to Dpb1 between the heights of the mountains Pma1 to Pmn and Pmb1 to Pmn and the depths of the valleys Pva1 to Pvn and Pvb1 to Pvn become smaller from the centers nef of the first and second bridge electrodes BRa and BRb toward the transparent barriers BWo, BWa, and BWb.

Particularly, as illustrated in the enlarged view of FIG. 13, as the heights of the mountains Pma1 to Pmn and Pmb1 to Pmn are constant and the depths of the valleys Pva1 to Pvn and Pvb1 to Pvn become smaller from the first and second bridge electrodes BRa and BRb toward the transparent barriers BWo, BWa, and BWb, the differences DPn to Dpa1 and Dpn to Dpb1 between the heights of the mountains Pma1 to Pmn and Pmb1 to Pmn and the depths of the valleys Pva1 to Pvn and Pvb1 to Pvn become smaller.

Since the differences DPn to Dpa1 and Dpn to Dpb1 between the heights of the mountains Pma1 to Pmn and Pmb1 to Pmn and the depths of the valleys Pva1 to Pvn and Pvb1 to Pvn become smaller from the first and second bridge electrodes BRa and BRb toward the transparent barriers BWo, BWa, and BWb, light is refracted more from transparent barriers BWo, BWa, and BWb toward the first and second bridge electrodes BRa and BRb. As a result, not the first and second bridge electrodes BRa and BRb but the transparent barriers BWo, BWa, and BWb are seen in front of the first and second bridge electrodes BRa and BRb.

In other words, since the differences DPn to Dpa1 and Dpn to Dpb1 between the heights of the mountains Pma1 to Pmn and Pmb1 to Pmn and the depths of the valleys Pva1 to Pvn and Pvb1 to Pvn become larger from the transparent barriers BWo, BWa, and BWb toward the first and second bridge electrodes BRa and BRb, light is refracted more from transparent barriers BWo, BWa, and BWb toward the first and second bridge electrodes BRa and BRb. As a result, not the first and second bridge electrodes BRa and BRb but the transparent barriers BWo, BWa, and BWb are seen in front of the first and second bridge electrodes BRa and BRb.

Accordingly, the user across the fronts of the first and second bridge electrodes BRa and BRb may tricked into seeing the transparent barriers BWo, BWa, and BWb, without noticing the first and second bridge electrodes BRa and BRb. As a consequence, the first and second bridge electrodes BRa and BRb between the display 180 and the signal processor 300 may look transparent.

In the enlarged view of FIG. 13, the refraction angle of light becomes larger, θa, θb, and θc from the transparent barriers BWo, BWa, and BWb toward the first and second bridge electrodes BRa and BRb.

Meanwhile, as illustrated in the enlarged view of FIG. 13, the heights of the plurality of mountains Pma1 to Pmn and PMb1 to Pmn are constant and the depths of the valleys Pva1 to Pvn and Pvb1 to Pvn increase, from the first and second bridge electrodes BRa and BRb toward the transparent barriers BWo, BWa, and BWb, with virtual lines connecting the valleys Pva1 to Pvn and Pvb1 to Pvn corresponding to non-spherical curves CURa and CURb.

That is, the depths of the valleys Pva1 to Pvn and Pvb1 to Pvn may increase non-linearly, from the first and second bridge electrodes BRa and BRb toward the transparent barriers BWo, BWa, and BWb. Particularly, the variation of the depths of the valleys Pva1 to Pvn and Pvb1 to Pvn may increase gradually, from the first and second bridge electrodes BRa and BRb toward the transparent barriers BWo, BWa, and BWb.

Since the variation of the depths of the valleys Pva1 to Pvn and Pvb1 to Pvn may increase gradually, from the first and second bridge electrodes BRa and BRb toward the transparent barriers BWo, BWa, and BWb, that is, the depths increase non-linearly, the refractive indexes of the Fresnel patterns 410a and 410b may be changed non-linearly from the first and second bridge electrodes BRa and BRb toward the transparent barriers BWo, BWa, and BWb.

Thus, the refractive indexes of the Fresnel patterns 410a and 410b decrease from the first and second bridge electrodes BRa and BRb toward the transparent barriers BWo, BWa, and BWb. That is, the refractive indexes of the Fresnel patterns 410a and 410b increase from the transparent barriers BWo, BWa, and BWb toward the first and second bridge electrodes BRa and BRb. As a consequence, with the first and second bridge electrodes BRa and BRb unnoticeable, the transparent barriers BWo, BWa, and BWb are seen from across the fronts of the first and second bridge electrodes BRa and BRb.

Particularly, the optical sheet 400 is advantageously thinner by use of a plurality of Fresnel patterns without separate optical lenses for the optical sheet 400.

Meanwhile, as illustrated in FIG. 13, the width of the Fresnel pattern 410a is preferably larger than the width C of the first or second bridge electrode BRa or BRb.

As illustrated in FIG. 13, the Fresnel pattern 410a is formed on an end portion of the optical sheet 400, across the first or second bridge electrode BRa or BRb and on parts of the transparent barriers BWo and BWa, so that light output from the transparent barriers BWo and BWa may be refracted more toward the first or second bridge electrode BRa or BRb through the Fresnel patterns 410a and 410b.

Meanwhile, the Fresnel pattern 410a may be engraved, as illustrated in FIG. 13. Since the Fresnel patterns 410a and 410b are engraved in a partial area of the optical sheet 400 wear and tear of the Fresnel patterns 410a and 410b may be reduced.

The base 420 may contain silicon which may have a refractive index of about 1.42.

Meanwhile, the transparent barriers BWo and BWa or 430 may contain silicon which may have a refractive index of about 1.42.

Preferably, the refractive index of the Fresnel patterns 410a and 410b are higher than that of the base 420, and is about 1.5 to 1.8.

The height A of the base 420 may be 1 to 5 mm.

Preferably, the width B of the Fresnel pattern 410a is larger than the height A of the base 420.

For example, if the width B of the Fresnel pattern 410a increases and thus the Fresnel pattern 410a is extended to cover most of the transparent barriers BWo and BWa as well as the first and second bridges BRa and BRb, light emitted from the transparent barriers BWo and BWa is refracted more toward the first and second bridges BRa and BRb. Therefore, the light emitted from the transparent barriers BWo and BWa may be degraded.

In this context, although the width B of each of the Fresnel patterns 410a and 410b is larger than that of each of the first and second bridges BRa and BRb, the width B of each of the Fresnel patterns 410a and 410b is preferably smaller than the height A of the base 420.

If the width B of each of the Fresnel patterns 410a and 410b is smaller than the height A of the base 420, that is, the height A of the base 420 is greater than the width B of each of the Fresnel patterns 410a and 410b, the first and second bridges BRa and BRb are not seen from across the first and second bridges BRa and BRb, and the degradation of light emitted from the transparent barriers BWo and BWa is reduced.

Preferably, the height A of the base 420 is greater than the width C of each of the first and second bridges BRa and BRb.

As described above, since it is preferred that the height A of the base 420 is greater than the width B of each of the Fresnel patterns 410a and 410b, the height A of the base 420 is preferably greater than the width C of each of the first and second bridges BRa and BRb so that the first and second bridges BRa and BRb may not be seen from across the first and second bridges BRa and BRb, and the degradation of light emitted from the transparent barriers BWo and BWa may be reduced.

Meanwhile, as the width D of each of the transparent barriers BWo and BWa is set to be larger than the width C of each of the first and second bridges BRa and BRb, the first and second bridges BRa and BRb may not be seen from across the first and second bridges BRa and BRb, that is, the first and second bridges BRa and BRb may look transparent.

Each of the Fresnel patterns 410a and 410b includes a plurality of mountains Pma1 to Pmn or Pmb1 to Pmn, and a plurality of valleys Pva1 to Pvn or Pvb1 to Pvn. As illustrated in FIG. 13, the angle θn of a mountain Pm is preferably increased from the first and second bridges BRa and BRb toward the transparent barriers BWo and BWa.

If the angle θn of the mountain Pm is increased from the first and second bridges BRa and BRb toward the transparent barriers BWo and BWa, that is the angle θn of the mountain Pm is decreased from the transparent barriers BWo and BWa toward the first and second bridges BRa and BRb, light output from the transparent barriers BWo and BWa is refracted more toward the first and second bridges BRa and BRb by the Fresnel patterns 410a and 410b.

Accordingly, the effect of rendering the first and second bridges BRa and BRb invisible and rendering the transparent barriers BWo and BWa noticeable from across the fronts of the first and second bridges BRa and BRb is produced.

Unlike the optical sheet 400 illustrated in FIGS. 12 and 13, the Fresnel patterns 410a and 410b may be embossed.

Unlike the optical sheet 400 illustrated in FIGS. 12 and 13, an air gap (not shown) may further be defined between the base 420 and the transparent barriers BWo, BWa, and BWb & the first and second bridges BRa and BRb.

Figure 14:
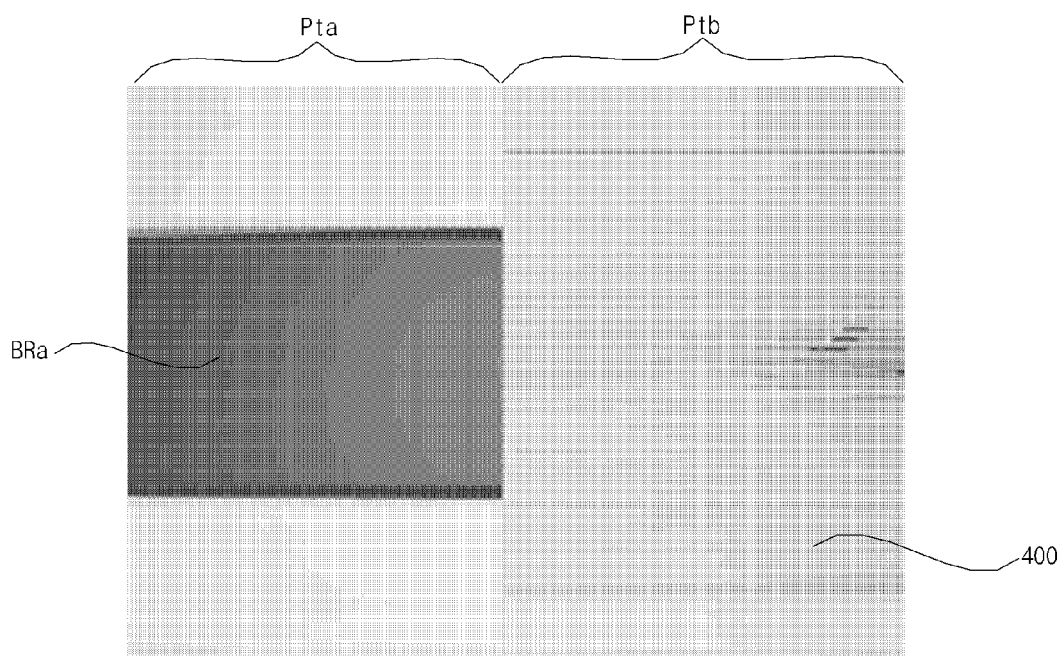
FIG. 14 is a view referred to for describing the performance of an optical sheet illustrated in FIG. 11.

FIG. 14 is a view referred to for describing the performance of the optical sheet illustrated in FIG. 11.

Referring to FIG. 14, the optical sheet 400 is not attached on a first area Pta, whereas the optical sheet 400 is attached on a second area Ptb.

Without the optical sheet 400 in the first area Pta, the first and second bridges BRa and BRb are seen. In contrast, the first and second bridges BRa and BRb are not perceived in the second area Ptb due to light refraction of the transparent barriers BWo and BWa attributed to attachment of the optical sheet 400 on the second area Ptb.

As a consequence, with the first and second bridges BRa and BRb unseen between the display 180 and the signal processor 300, the effect of making the display 180 look hanging in the air is enhanced, thereby increasing an aesthetic effect.

Figure 15:
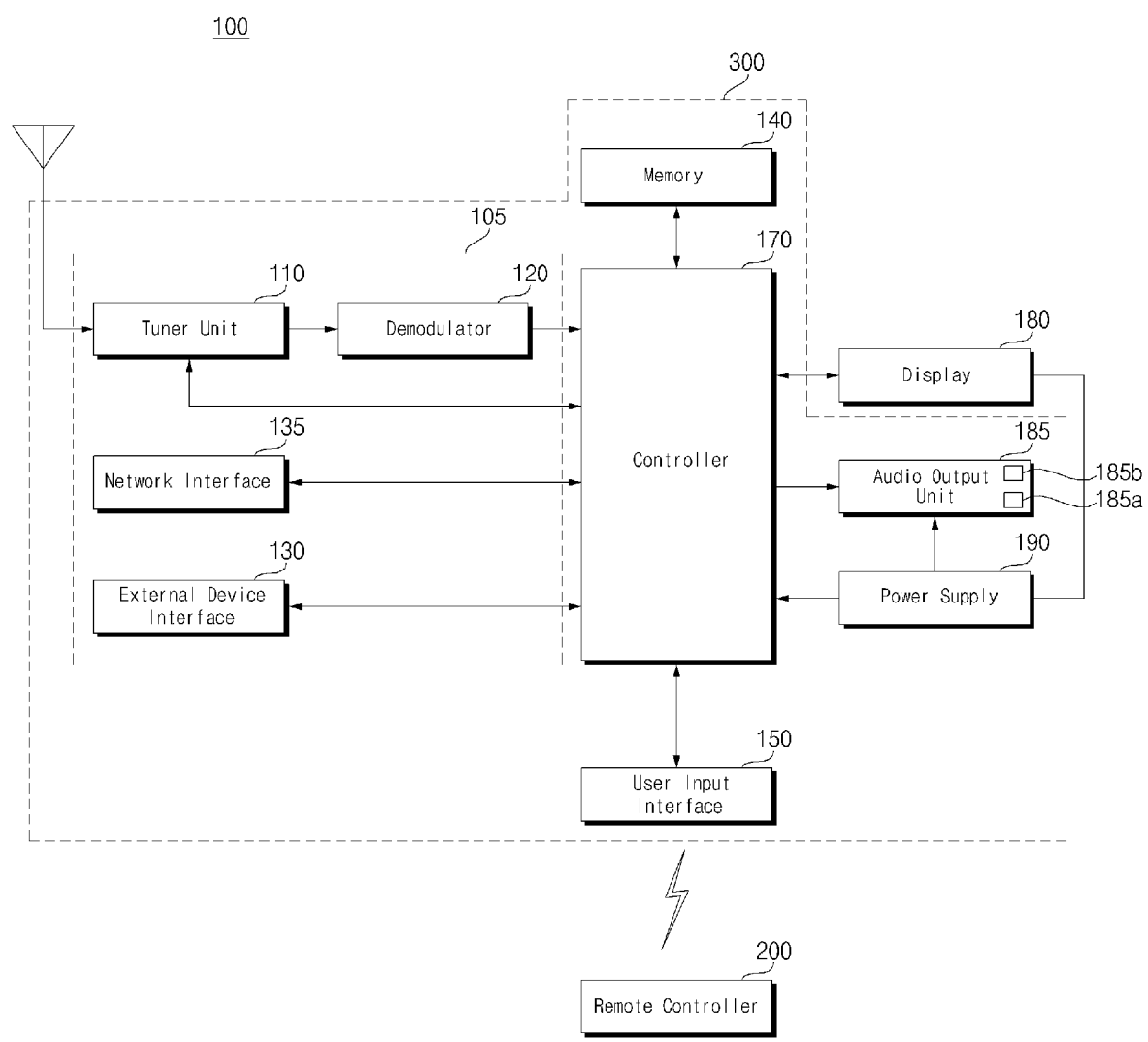
FIG. 15 is a block diagram illustrating the image display apparatus illustrated in FIG. 1.

FIG. 15 is a view illustrating the image display apparatus illustrated in FIG. 1.

Referring to FIG. 15, the image display apparatus 100 according to an embodiment of the present disclosure may include a broadcasting receiver 105, a memory 140, a user input interface 150, a sensor unit (not shown), a controller 170, the display 180, and an audio output unit 185.

The broadcasting receiver 105 may include a tuner unit 110, a demodulator 120, an external device interface 130, and a network interface 135. When needed, the broadcasting receiver 105 may be designed to include the tuner unit 110 and the demodulator 120 without the network interface 135, and vice versa. That is, the broadcasting receiver 105 may be designed to include the network interface 135 without the tuner unit 110 and the demodulator 120.

Unlike FIG. 15, the broadcasting receiver 105 may not include the external device interface 130. For example, it is possible to receive a broadcast signal from the set-top box (not shown) through the external device interface 130.

The tuner unit 110 selects a Radio Frequency (RF) broadcast signal corresponding to a channel selected by a user or an RF broadcast signal corresponding to each of pre-stored channels from among a plurality of RF broadcast signals received through an antenna, and downconverts the selected RF broadcast signal into an Intermediate Frequency (IF) signal or a baseband Audio/Video (A/V) signal.

For example, if the selected RF broadcast signal is a digital broadcast signal, the tuner unit 110 downconverts the selected RF broadcast signal into a digital IF signal. On the other hand, if the selected RF broadcast signal is an analog broadcast signal, the tuner unit 110 downconverts the selected RF broadcast signal into an analog baseband A/V signal, CVBS/SIF. That is, the tuner unit 110 may process a digital broadcast signal or an analog broadcast signal. The analog baseband A/V signal, CVBS/SIF from the tuner unit 110 may be provided directly to the controller 170.

The tuner unit 110 may sequentially select a number of RF broadcast signals corresponding to all broadcast channels previously stored in the image display apparatus 100 by a channel add function from among a plurality of RF signals received through the antenna, and may downconvert the selected RF broadcast signals into IF signals or baseband A/V signals.

The tuner unit 110 may include a plurality of tuners for receiving broadcast signals of a plurality of channels, or a single tuner for simultaneously receiving broadcast signals of a plurality of channels.

The demodulator 120 receives the digital IF signal from the tuner unit 110 and demodulates the digital IF signal.

The demodulator 120 may perform demodulation and channel decoding on the digital IF signal, thereby obtaining a stream signal TS. The stream signal TS may be a signal in which a video signal, an audio signal and/or a data signal are multiplexed.

The stream signal may be input to the controller 170 and then subjected to demultiplexing and A/V signal processing. The controller 170 outputs the processed video and audio signals to the display 180 and the audio output unit 185, respectively.

The external device interface 130 may connect the image display apparatus 100 to an external device. For this purpose, the external device interface 130 may include an A/V Input/Output (I/O) unit (not shown) or a wireless communication unit (not shown).

The external device interface 130 may be connected to an external device, wirelessly or wiredly, such as a Digital Versatile Disk (DVD) player, a Blu-ray Disk (BD) player, a game console, a camera, a camcorder, a computer (e.g. a laptop computer), or a set-top box. Then, the external device interface 130 may transmit and receive signals to and from the external device.

The A/V I/O unit may receive audio and video signals from an external device, and the wireless communication unit may conduct short-range wireless communication with another electronic device.

The network interface 135 serves as an interface between the image display apparatus 100 and a wired/wireless network such as the Internet. For example, the network interface 135 may receive content or data from the Internet or from a Content Provider (CP) or a Network Provider (NP) over a network.

The memory 140 may store programs necessary for the controller 170 to process signals and control, and may also store a processed audio, video, or data signal.

The memory 140 may also temporarily store an audio, video or data signal received from the external device interface 130. The memory 140 may store information about broadcast channels by the channel-add function.

While the memory 140 is shown in FIG. 15 as configured separately from the controller 170, to which the present disclosure is not limited, the memory 140 may be incorporated into the controller 170.

The user input interface 150 transmits a signal received from the user to the controller 170 or transmits a signal received from the controller 170 to the user.

For example, the user input interface 150 may receive user input signals such as a power-on/off signal, a channel selection signal, and a screen setting signal from the remote controller 200, provide the controller 170 with user input signals received from local keys (not shown), such as inputs of a power key, a channel key, a volume key, and a setting value, transmit a user input signal received from the sensor unit (not shown) that senses a user gesture to the controller 170, or transmit a signal received from the controller 170 to the sensor unit.

The controller 170 may demultiplex a stream signal received from the tuner unit 110, the demodulator 120, or the external device interface 130 into a number of signals, and process the demultiplexed signals into audio and video signals.

The video signal processed by the controller 170 may be displayed as an image corresponding to the video signal on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to an external output device through the external device interface 130.

While not shown in FIG. 15, the controller 170 may include a Demultiplexer (DEMUX) and a video processor, which will be described later with reference to FIG. 16.

In addition, the controller 170 may provide overall control to the image display apparatus 100. For example, the controller 170 may control the tuner unit 110 to select an RF broadcast signal corresponding to a user-selected channel or a pre-stored channel.

The controller 170 may control the image display apparatus 100 according to a user command received through the user input interface 150 or according to an internal program.

The controller 170 may control the display 180 to display an image. The image displayed on the display 180 may be a Two-Dimensional (2D) or Three-Dimensional (3D) still image or video.

The controller 170 may control a particular 2D object in the image displayed on the display 180 to be rendered as a 3D object. For example, the particular 2D object may be at least one of a linked Web page (e.g. from a newspaper or a magazine), an Electronic Program Guide (EPG), a menu, a widget, an icon, a still image, a video, or text.

The controller 170 may locate the user based on an image captured by a camera unit (not shown). For example, the controller 170 may determine the distance (a z-axis coordinate) between the user and the image display apparatus 100. In addition, the controller 170 may determine x-axis and y-axis coordinates corresponding to the position of the user on the display 180.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are decoded together with a decoded image to a stream. The controller 170 may display a thumbnail list including a plurality of received thumbnail images on the display 180.

The thumbnail list may be displayed on a part of the display 180 with an image displayed on the display 180, that is, as a compact view, or the thumbnail list may be displayed in full screen on the display 180. The thumbnail images of the thumbnail list may be updated sequentially.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 may also be a 3D display.

The display 180 may also be a touch screen that can be used not only as an output device but also as an input device.

The audio output unit 185 may receive a processed audio signal from the controller 170 and output the received audio signal as voice.

As described before, the audio output unit 185 may include the first speaker unit 185a and the second speaker unit 185b. The second speaker unit 185b may include the array speakers SHa and SHb each including a plurality of speakers.

A camera unit (not shown) captures a user. The camera unit may include, but not limited to, a single camera. When needed, the camera unit may include a plurality of cameras. The camera unit may be embedded on the display 180 in the image display apparatus 100, or may be separately configured. Image information captured by the camera unit may be provided to the controller 170.

The controller 170 may sense a user's gesture from a captured image received from the camera unit or from signals received from the sensor unit (not shown) alone or in combination.

The power supply 190 supplies power across the whole image display apparatus 100. Particularly, the power supply 190 may supply power to the controller 170 which may be implemented as a System On Chip (SOC), the display 180 for displaying an image, and the audio output unit 185 for outputting an audio signal.

Specifically, the power supply 190 may include a converter to convert Alternating Current (AC) power to Direct Current (DC) power, and a DC/DC converter to convert the level of DC power.

The remote controller 200 transmits a user input to the user input interface 150. For the transmission of a user input, the remote controller 200 may operate based on various communication standards such as Bluetooth, RE communication, IR communication, Ultra WideBand (UWB), and ZigBee. In addition, the remote controller 200 may receive a video signal, an audio signal and/or a data signal from the user input interface 150 and may output the received signal as an image or sound.

The above-described image display apparatus 100 may be a fixed or mobile digital broadcast receiver.

The block diagram of the image display apparatus 100 illustrated in FIG. 15 is an exemplary embodiment of the present disclosure. The image display apparatus 100 is shown in FIG. 15 as having a number of components in a given configuration. However, the image display apparatus 100 may include fewer components or more components than those shown in FIG. 15. Also, two or more components of the image display apparatus 100 may be combined into a single component or a single component thereof may be separated into two more components. The functions of the components of the image display apparatus 100 as set forth herein are illustrative in nature and may be modified, for example, to meet the requirements of a given application.

Unlike the configuration illustrated in FIG. 15, the image display apparatus 100 may be configured so as to receive and playback video content through the network interface 135 or the external device interface 130, without the tuner unit 100 and the demodulator 120.

The image display apparatus 100 is an example of an image signal processing apparatus that processes an input or stored image. In another example, the image display apparatus 100 may be implemented into a set-top box without the display 180 and the audio output unit 185 illustrated in FIG. 15, a DVD player, a Blue-ray player, a game console, a computer, or the like.

Figure 16:
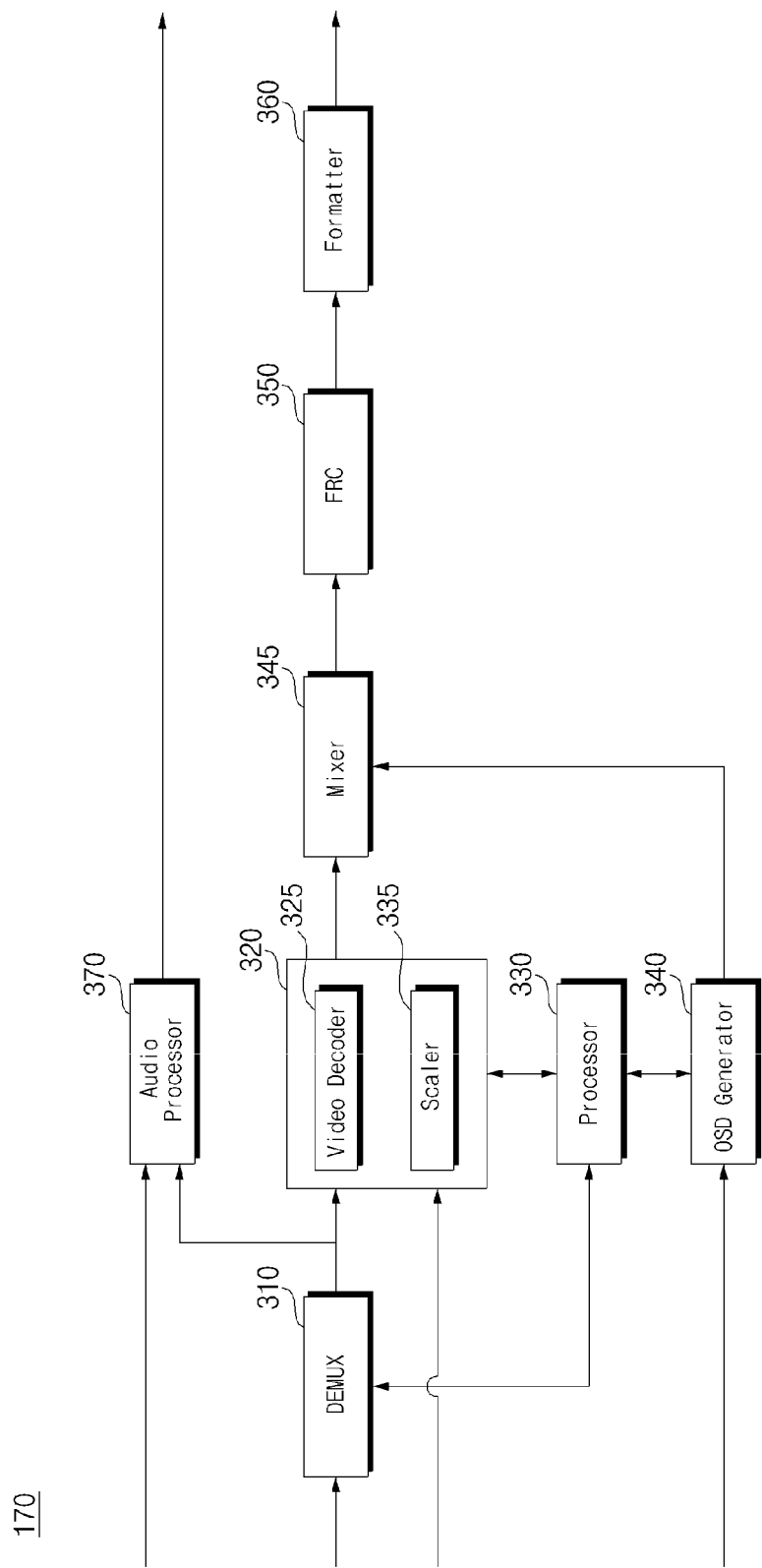
FIG. 16 is a block diagram illustrating a controller illustrated in FIG. 15.

FIG. 16 is a block diagram of the controller illustrated in FIG. 15.

Referring to FIG. 16, the controller 170 may include a DEMUX 310, a video processor 320, a processor 330, an OSD generator 340, a mixer 345, a Frame Rate Converter (FRC) 350, and a formatter 360 according to an embodiment of the present invention. The controller 170 may further include an audio processor 370 and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner unit 110, the demodulator 120, or the external device interface 130.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal may be displayed on the display 180.

The video decoder 325 may be provided with decoders that operate in conformance to various standards.

The processor 330 may provide overall control to the image display apparatus 100 or the controller 170. For example, the processor 330 may control the tuner unit 110 to tune to an RF broadcasting corresponding to a user-selected channel or a pre-stored channel.

The processor 330 may also control the image display apparatus 100 according to a user command received through the user input interface 150 or an internal program.

The processor 330 may control data transmission through the network interface 135 or the external device interface 130.

The processor 330 may control operations of the DEMUX 310, the video processor 320, and the OSD generator 340 in the controller 170.

The OSD generator 340 generates an OSD signal autonomously or according to a user input. For example, the OSD generator 340 may generate signals by which a variety of information is displayed as graphics or text on the display 180, according to user input signals. The OSD signal may include various data such as a User Interface (UI), a variety of menus, widgets, and icons.

Further, the OSD generator 340 may generate a pointer to be displayed on the display 180 based on a pointing signal received from the remote controller 200. Especially, the pointer may be generated from a pointing signal processor (not shown), which may reside in the OSD generator 340. Obviously, the pointing signal processor may be configured separately from the OSD generator 240.

The mixer 345 may mix the decoded video signal processed by the video processor 320 with the OSD signal generated from the OSD generator 340.

The FRC 350 may change the frame rate of an input video signal or simply output the video signal without frame rate conversion.

The formatter 360 may convert a received signal to a video signal to be provided to the display 180. For example, the formatter 360 may convert the received signal into a Low Voltage Differential Signal (LVDS) or mini-LVDS.

The audio processor 370 of the controller 170 may process the demultiplexed audio signal, or an audio signal of specific content. For the audio signal processing, the audio processor 370 may have a plurality of decoders.

The audio processor 370 of the controller 170 may also adjust the bass, treble, and volume of the audio signal.

The data processor (not shown) of the controller 170 may process the data signal obtained by demultiplexing the input stream signal. For example, if the demultiplexed data signal is a coded data signal, the data processor may decode the coded data signal. The coded data signal may be an EPG which includes broadcasting information specifying the start time, end time, and the like of a scheduled broadcast program of each channel.

The block diagram of the controller 170 illustrated in FIG. 16 is purely exemplary. Depending upon the specifications of the controller 170 in actual implementation, the components of the controller 170 may be combined or omitted or new components may be added.

Especially, the FRC 350 and the formatter 360 may be configured as separate modules or as a single module, outside the controller 170.

Figure 17A:
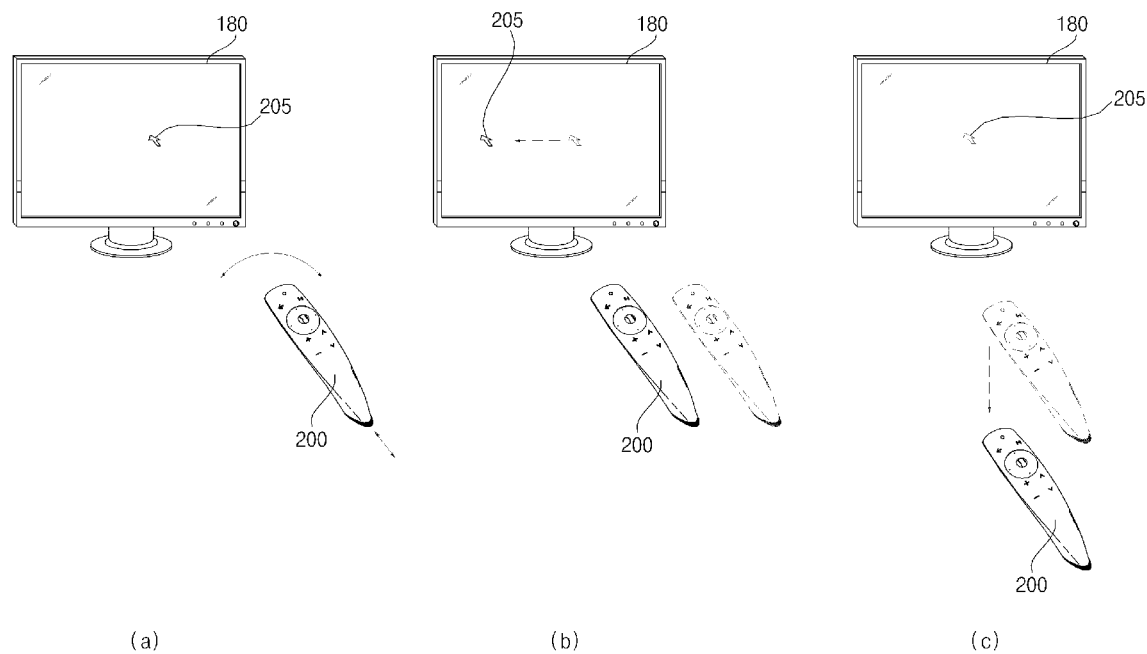
FIG. 17A is a view illustrating a method for controlling a remote controller illustrated in FIG. 15.

FIG. 17A illustrates a method for controlling the remote controller illustrated in FIG. 15.

(a) of FIG. 17A illustrates a pointer 205 representing movement of the remote controller 200, displayed on the display 180.

The user may move or rotate the remote controller 200 up and down, side to side ((b) of FIG. 17A), and back and forth ((c) of FIG. 17A). The pointer 205 displayed on the display 180 corresponds to movement of the remote controller 200. Since the pointer 205 moves in accordance with the movement of the remote controller 200 in a 3D space, the remote controller 200 may be referred to as a spatial remote controller or a 3D pointing device.

Referring to (b) of FIG. 17A, if the user moves the remote controller 200 to the left, the pointer 205 moves to the left on the display 180.

A sensor of the remote controller 200 detects the movement of the remote controller 200 and transmits motion information corresponding to the result of the detection to the image display apparatus. Then, the image display apparatus may determine the movement of the remote controller 200 based on the motion information received from the remote controller 200, and calculate the coordinates of a target point to which the pointer 205 should be shifted in accordance with the movement of the remote controller 200 based on the result of the determination. The image display apparatus then displays the pointer 205 at the calculated coordinates.

Referring to (c) of FIG. 17A, while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. On the other hand, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 17B:
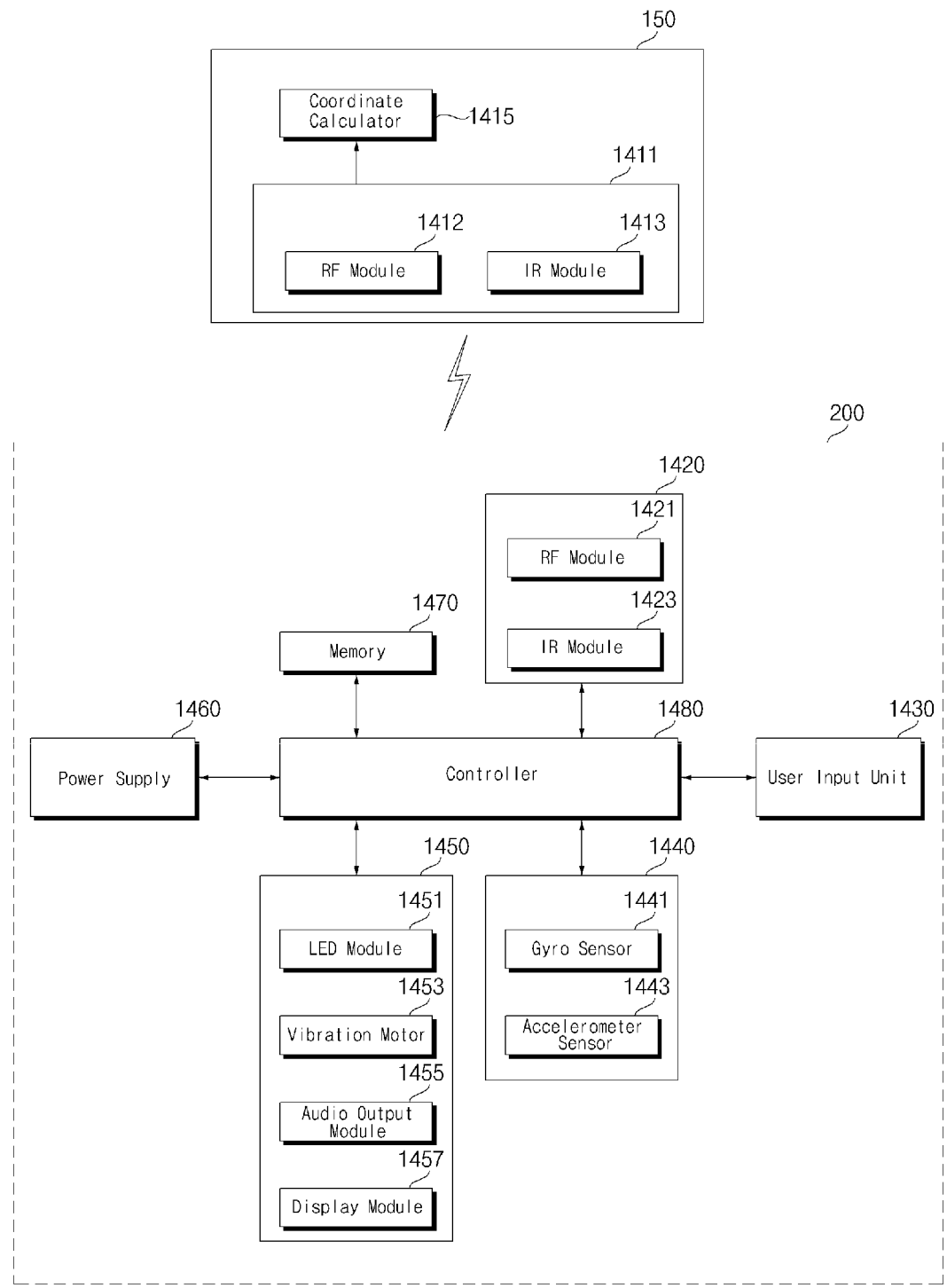
FIG. 17B is a block diagram illustrating the remote controller illustrated in FIG. 15.

FIG. 17B is a block diagram of the remote controller illustrated in FIG. 15.

Referring to FIG. 17B, the remote controller 200 may include a wireless communication module 1420, a user input unit 1430, a sensor unit 1440, an output unit 1450, a power supply 1460, a memory 1470, and a controller 1480.

The wireless communication module 1420 transmits signals to and/or receives signals from one of image display apparatuses according to embodiments of the present disclosure. One of the image display apparatuses according to embodiments of the present disclosure, that is, the image display apparatus 100 will be taken as an example.

In this embodiment, the wireless communication module 1420 may include an RF module 1421 for transmitting RF signals to and/or receiving RF signals from the image display apparatus 100 according to an RF communication standard. Further, the wireless communication module 1420 may include an IR module 1423 for transmitting IR signals to and/or receiving IR signals from the image display apparatus 100 according to an IR communication standard.

In this embodiment, the remote controller 200 may transmit a signal carrying information about movement of the remote controller 200 to the image display apparatus 100 through the RF module 1421.

Further, the remote controller 200 may receive signals from the image display apparatus 100 through the RF module 1421. The remote controller 200 may transmit commands, such as a power on/off command, a channel switching command, or a sound volume change command, to the image display apparatus 100 through the IR module 1423, as needed.

The user input unit 1430 may include a keypad, a plurality of buttons, a touch pad, or a touch screen. The user may enter commands to the image display apparatus 100 by manipulating the user input unit 1430. If the user input unit 1430 includes a plurality of hard-key buttons, the user may input various commands to the image display apparatus 100 by pressing the hard-key buttons. If the user input unit 1430 includes a touch screen displaying a plurality of soft keys, the user may input various commands to the image display apparatus 100 by touching the soft keys. The user input unit 1430 may also include various input tools other than those set forth herein, such as a scroll key and/or a jog key, which should not be construed as limiting the present disclosure.

The sensor unit 1440 may include a gyro sensor 1441 and/or an acceleration sensor 1443. The gyro sensor 1441 may sense the movement of the remote controller 200.

For example, the gyro sensor 1441 may sense motion information about the remote controller 200 in X-, Y-, and Z-axis directions. The acceleration sensor 1443 may sense the moving speed of the remote controller 200. The sensor unit 1440 may further include a distance sensor for sensing the distance between the remote controller 200 and the display 180.

The output unit 1450 may output a video and/or audio signal corresponding to a manipulation of the user input unit 1430 or a signal transmitted by the image display apparatus 100. The user may easily identify whether the user input unit 1430 has been manipulated or whether the image display apparatus 100 has been controlled based on the video and/or audio signal output from the output unit 1450.

For example, the output unit 1450 may include an LED module 1451 which is turned on or off whenever the user input unit 1430 is manipulated or whenever a signal is received from or transmitted to the image display apparatus 100 through the wireless communication module 1420, a vibration module 1453 which generates vibrations, an audio output module 1455 which outputs audio data, or a display module 1457 which outputs an image.

The power supply 1460 supplies power to the remote controller 200. If the remote controller 200 is kept stationary for a predetermined time or longer, the power supply 1460 may, for example, cut off supply of power to the remote controller 200 in order to save power. The power supply 1460 may resume supply of power if a specific key on the remote controller 200 is manipulated.

The memory 1470 may store various programs and application data for controlling or operating the remote controller 200. The remote controller 200 may wirelessly transmit signals to and/or receive signals from the image display apparatus 100 in a predetermined frequency band through the RF module 1421. The controller 1480 of the remote controller 200 may store information regarding the frequency band used for the remote controller 200 to wirelessly transmit signals to and/or wirelessly receive signals from the paired image display apparatus 100 in the memory 1470 and may then refer to this information for use at a later time.

The controller 1480 provides overall control to the remote controller 200. For example, the controller 1480 may transmit a signal corresponding to a key manipulation detected from the user input unit 1430 or a signal corresponding to motion of the remote controller 200, as sensed by the sensor unit 1440, to the image display apparatus 100 through the wireless communication module 1420.

The user input interface 150 of the image display apparatus 100 may include a wireless communication module 1411 which wirelessly transmits signals to and/or wirelessly receives signals from the remote controller 200, and a coordinate calculator 1415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through an RF module 1412. In addition, the user input interface 150 may wirelessly receive IR signals from the remote controller 200 through an IR module 1413 according to the IR communication standard.

The coordinate calculator 1415 may receive motion information regarding the movement of the remote controller 200 through the wireless communication module 1411 and may calculate coordinates (x, y) representing the position of the pointer 205 on a screen of the display 180 by correcting the motion information for possible errors or user hand tremor.

A signal received in the image display apparatus 100 from the remote controller 200 through the user input interface 150 may be transmitted to the controller 170. Then, the controller 170 may acquire information regarding the movement of the remote controller 200 and information regarding a key manipulation detected from the remote controller 200 from the signal received from the remote controller 200, and may control the image display apparatus 100 based on the acquired information.

In another example, the remote controller 200 may calculate the coordinates of a position to which the pointer is to be shifted in correspondence with its movement and output the coordinates to the user input interface 150 of the image display apparatus 100. In this case, the user input interface 150 may transmit information about the pointer coordinates which was not corrected for possible errors or user hand tremor to the controller 170.

In a further example, unlike the configuration of the remote controller 200 illustrated in FIG. 17B, the coordinate calculator 1415 may reside in the controller 170, instead of the user input interface 150.

As is apparent from the foregoing description, according to an embodiment of the present disclosure, an image display apparatus includes a display including a first electrode and a second electrode, for wireless power reception, a signal processor disposed apart from the display, and including a third electrode and a fourth electrode, for wireless power transmission, and a first bridge electrode and a second bridge electrode, including one ends apart from the first electrode and the second electrode, facing the first electrode and the second electrode, and the other ends apart from the first bridge electrode and the second bridge electrode, facing the first bridge electrode and the second bridge electrode. Therefore, wireless power may be transferred efficiently between the display and the signal processor which are arranged apart from each other.

Preferably, a gap between the first bridge electrode and the second bridge electrode is larger than a width of the first bridge electrode or a width of the second bridge electrode. Therefore, interference between the first bridge electrode and the second bridge electrode is reduced, thereby increasing the efficiency of wireless power transfer between the display and the signal processor which are arranged apart from each other.

Both ends of each of the first bridge electrode and the second bridge electrode may be wider than a center of the bridge electrode. The resulting reduction of the width of the center of each of the first bridge electrode and the second bridge electrode may enhance an aesthetic effect brought by the first bridge electrode and the second bridge electrode.

The width of each of the first bridge electrode and the second bridge electrode may increase toward both ends of the bridge electrode. The resulting reduction of the width of the center of each of the first bridge electrode and the second bridge electrode may enhance the aesthetic effect brought by the first bridge electrode and the second bridge electrode.

Both ends of each of the first bridge electrode and the second bridge electrode may be thicker than the center of the bridge electrode, thereby enhancing the aesthetic effect brought by the first bridge electrode and the second bridge electrode.

When power calculated based on a detected current or voltage is equal to or less than a predetermined first value, the display transmits received power information to the signal processor and receives boosted first power wirelessly from the signal processor. Therefore, the display may display an image stably.

When required power is equal to or greater than a predetermined second value, the display transmits required power information to the signal processor, and receives boosted second power from the signal processor. Accordingly, wireless power may be received in correspondence with the required power, thereby enabling stable image display.

Particularly, the display calculates the required power according to luminance information about an image to be displayed, and when the calculated required power is equal to or greater than the predetermined second value, transmits the required power information to the signal processor. Thus, as the luminance of the image to be displayed is higher, the level of received wireless power increased. Therefore, the image may be displayed stably.

As a modulation signal is added to wireless power between the signal processor and the display, state information or control information may be transmitted in the modulation signal. The resulting wireless power transmission adapted to the states of the signal processor and the display may lead to efficient wireless power transmitter.

When required consumption power is larger than received wireless power, the display consumes part of the received wireless power by operating a switching element of the rectifier, thereby preventing extra power from damaging circuit elements.

Since an attachment member on which the first bridge electrode and the second electrode are arranged is attached onto a wall behind the display and the signal processor, the first bridge electrode and the second electrode may be disposed simply.

An optical sheet attached on the first bridge electrode and the second electrode is provided. The optical sheet includes a Fresnel pattern formed on the first bridge electrode and the second electrode, and the Fresnel pattern includes a plurality of mountains and a plurality of valleys. As differences between heights of the mountains and depths of the valleys become narrower from the first bridge electrode and the second electrode toward the transparent barrier, the first bridge electrode and the second electrode which are colored are not seen across from the fronts of the first bridge electrode and the second electrode. That is, the first bridge electrode and the second electrode look transparent, thereby enhancing the aesthetic effect.

The image display apparatus according to the foregoing exemplary embodiments are not restricted to the exemplary embodiments set forth herein. Therefore, variations and combinations of the exemplary embodiments set forth herein may fall within the scope of the present disclosure.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An image display apparatus comprising:
   a display including a first electrode and a second electrode, for wireless power reception;
   a signal processor disposed apart from the display, and including a third electrode and a fourth electrode, for wireless power transmission; and
   a first bridge electrode and a second bridge electrode, including one ends apart from the first electrode and the second electrode, facing the first electrode and the second electrode, and other ends apart from the third electrode and the fourth electrode, facing the third electrode and the fourth electrode,
   wherein wireless power is transferred from the signal processor to the display by the first and second bridge electrodes, based on capacitance between the first and second bridge electrodes and the first and second electrodes, and capacitance between the first and second bridge electrodes and the third and fourth electrodes, respectively.

2. The image display apparatus according to claim 1, wherein a gap between the first bridge electrode and the second bridge electrode is larger than a width of the first bridge electrode or a width of the second bridge electrode.

3. The image display apparatus according to claim 1, wherein both ends of each of the first bridge electrode and the second bridge electrode are wider than a center of the bridge electrode.

4. The image display apparatus according to claim 1, wherein a width of each of the first bridge electrode and the second bridge electrode increases toward both ends of the bridge electrode.

5. The image display apparatus according to claim 1, wherein both ends of each of the first bridge electrode and the second bridge electrode are thicker than a center of the bridge electrode.

6. The image display apparatus according to claim 1, wherein the signal processor further comprises:
a power transmission circuit unit including an inverter having a plurality of switching elements, to convert Direct Current (DC) power to Alternating Current (AC) power, a first resonator for resonating with the AC power received from the inverter, and an inverter controller to control the inverter, and
wherein the third electrode and the fourth electrode output the AC power received from the first resonator.

7. The image display apparatus according to claim 6, wherein the signal processor further comprises a converter at a front end of the inverter, for boosting the DC power.

8. The image display apparatus according to claim 1, wherein the display further comprises:
a power reception circuit unit including a second resonator for resonating with AC power received from the first electrode and the second electrode, and a rectifier including a plurality of diode elements, to rectify the AC power received from the second resonator.

9. The image display apparatus according to claim 1, wherein the display further comprises:
a power reception circuit unit including a second resonator for resonating with AC power received from the first electrode and the second electrode, a rectifier including a plurality of switching elements, to rectify the AC power received from the second resonator, and a rectification controller to control the rectifier.

10. The image display apparatus according to claim 1, wherein the display further comprises:
a detector to detect a current or a voltage based on power received through the first electrode and the second electrode, and
wherein when power calculated based on the detected current or voltage is equal to or less than a predetermined first value, the display transmits received power information to the signal processor and receives boosted first power wirelessly from the signal processor.

11. The image display apparatus according to claim 10, wherein the signal processor receives the received power information from the display, and wirelessly transmits the boosted first power based on the received power information.

12. The image display apparatus according to claim 1, wherein when a required power is equal to or greater than a predetermined second value, the display transmits required power information to the signal processor, and receives a boosted second power from the signal processor.

13. The image display apparatus according to claim 12, wherein the signal processor receives the required power information from the display, and wirelessly transmits the boosted second power based on the received required power information.

14. The image display apparatus according to claim 12, wherein the display calculates the required power according to luminance information about an image to be displayed, and when the calculated required power is equal to or greater than the predetermined second value, transmits the required power information to the signal processor.

15. The image display apparatus according to claim 6, wherein the signal processor changes a switching frequency of the plurality of switching elements in the inverter, and adds a modulation signal including state information or control information to output wireless power, and
wherein the display extracts the modulation signal based on current detection or voltage detection based on the received wireless power.

16. The image display apparatus according to claim 9, wherein the display adds a modulation signal including state information or control information by changing capacitance of a capacitor in the second resonator, and
wherein the signal processor extracts the modulation signal based on current detection or voltage detection based on wireless power transmission.

17. The image display apparatus according to claim 1, wherein the display and the signal processor exchange state information or control information at a frequency different from a frequency used for the wireless power transmission.

18. The image display apparatus according to claim 9, wherein when required consumption power is larger than received wireless power, the display consumes part of the received wireless power by operating a switching element of the rectifier.

19. The image display apparatus according to claim 1, further comprising an attachment member on which the first bridge electrode and the second bridge electrode are arranged,
wherein the attachment member is attached onto a wall behind the display and the signal processor.

20. The image display apparatus according to claim 1, further comprising an optical sheet attached on the first bridge electrode and the second electrode,
wherein the optical sheet includes a Fresnel pattern formed on the first bridge electrode and the second electrode, and a transparent barrier formed between the first bridge electrode and the second electrode, and
wherein the Fresnel pattern includes a plurality of mountains and a plurality of valleys, and differences between heights of the mountains and depths of the valleys become narrower from the first bridge electrode and the second electrode toward the transparent barrier.

* * * * *